United States Patent
Moulin et al.

(10) Patent No.: US 11,506,272 B2
(45) Date of Patent: Nov. 22, 2022

(54) TRACK SYSTEM WITH A SUPPORT MEMBER

(71) Applicant: Lear Corporation, Southfield, MI (US)

(72) Inventors: Antoine Moulin, Aurec-sur-Loire (FR); Jeffrey A. Jones, Ann Arbor, MI (US); Sven Vesper, Remscheid (DE); Marlon Christian Grosser, Reimscheid (DE); Raúl Ricart, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/179,144

(22) Filed: Feb. 18, 2021

(65) Prior Publication Data
US 2021/0265776 A1    Aug. 26, 2021

Related U.S. Application Data

(60) Provisional application No. 62/979,812, filed on Feb. 21, 2020.

(51) Int. Cl.
*F16H 55/26*      (2006.01)
*F16H 19/04*      (2006.01)
(Continued)

(52) U.S. Cl.
CPC ........... *F16H 55/26* (2013.01); *B60N 2/0722* (2013.01); *B60N 2/08* (2013.01); *B61B 13/02* (2013.01);
(Continued)

(58) Field of Classification Search
CPC ........ H01R 33/94; H01R 33/02; H01R 33/92; H01R 2201/26; H01R 13/62911;
(Continued)

(56) References Cited

U.S. PATENT DOCUMENTS

| | | |
|---|---|---|
| 1,962,789 A | 6/1934 | Simpson |
| 2,126,143 A | 8/1938 | McGregor |
(Continued)

FOREIGN PATENT DOCUMENTS

| | | |
|---|---|---|
| CN | 203190203 U | 9/2013 |
| CN | 203799201 U | 8/2014 |
(Continued)

OTHER PUBLICATIONS

Co-Pending U.S. Appl. No. 16/711,661, filed Dec. 12, 2019.
(Continued)

*Primary Examiner* — Oscar C Jimenez
*Assistant Examiner* — Paul D Baillargeon
(74) *Attorney, Agent, or Firm* — Fishman Stewart PLLC

(57) ABSTRACT

A support member may be connectable in a removable and adjustable manner to a track assembly. The support member may include an electrical connector, a contact, and a biasing member. The electrical connector may be adjustable to a first position and a second position. The contact may be connected to the electrical connector and configured to engage a conductor of said track assembly. The contact may be engageable with said conductor when the electrical connector is in the first position. The contact may not be engageable with said conductor when the electrical connector is in the second position. The biasing member may be configured to bias the contact into engagement with said conductor when the electrical connector is in the first position.

20 Claims, 32 Drawing Sheets

(51) Int. Cl.
  *F16H 55/17* (2006.01)
  *F16H 57/12* (2006.01)
  *B61B 13/02* (2006.01)
  *B61C 11/04* (2006.01)
  *H01R 13/187* (2006.01)
  *H01R 13/629* (2006.01)
  *H01R 33/02* (2006.01)
  *H01R 33/92* (2006.01)
  *H01R 33/94* (2006.01)
  *B61F 9/00* (2006.01)
  *E01B 25/04* (2006.01)
  *B60N 2/07* (2006.01)
  *B60N 2/08* (2006.01)
  *F16H 19/00* (2006.01)
  *H01R 39/64* (2006.01)

(52) U.S. Cl.
  CPC .......... *B61C 11/04* (2013.01); *B61F 9/00* (2013.01); *E01B 25/04* (2013.01); *F16H 19/04* (2013.01); *F16H 55/17* (2013.01); *F16H 57/12* (2013.01); *H01R 13/187* (2013.01); *H01R 13/62911* (2013.01); *H01R 33/02* (2013.01); *H01R 33/92* (2013.01); *H01R 33/94* (2013.01); *B60N 2/0715* (2013.01); *F16H 2019/008* (2013.01); *H01R 39/64* (2013.01); *H01R 2201/26* (2013.01)

(58) Field of Classification Search
  CPC .... H01R 13/187; H01R 25/14; H01R 24/142; H01R 24/144; H01R 24/146; H01R 39/64; H01R 39/643
  See application file for complete search history.

(56) References Cited

U.S. PATENT DOCUMENTS

| | | |
|---|---|---|
| 2,263,554 A | 11/1941 | Brach |
| 2,480,622 A | 8/1949 | Warnock |
| 2,678,082 A | 5/1954 | Nathan |
| 3,096,066 A | 7/1963 | Granet et al. |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,154,422 A | 5/1979 | Muhr |
| 4,198,025 A | 4/1980 | Lowe et al. |
| 4,238,099 A | 12/1980 | Hunwicks |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,804,229 A | 2/1989 | Nishino |
| 4,830,531 A | 5/1989 | Condit et al. |
| 4,853,555 A | 8/1989 | Wheat |
| 4,941,636 A | 7/1990 | Fujiwara et al. |
| 4,961,559 A | 10/1990 | Raymor |
| 4,969,621 A | 11/1990 | Munchow et al. |
| 4,987,316 A | 1/1991 | White et al. |
| 5,106,144 A | 4/1992 | Hayakawa et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,302,065 A | 4/1994 | Vogg et al. |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,524,504 A | 6/1996 | Brandoli et al. |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,785,387 A | 7/1998 | Hernandez et al. |
| 5,796,177 A | 8/1998 | Werbelow et al. |
| 5,800,015 A | 9/1998 | Tsuchiya et al. |
| 5,893,545 A | 4/1999 | Lyons et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,008,547 A | 12/1999 | Dobler et al. |
| 6,036,157 A | 3/2000 | Baroin et al. |
| 6,081,044 A | 6/2000 | Anthofer et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,260,813 B1 | 7/2001 | Whitcomb |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,364,272 B1 | 4/2002 | Schuler et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,565,119 B2 | 5/2003 | Fogle, Jr. |
| 6,566,765 B1 | 5/2003 | Nitschke et al. |
| 6,588,722 B2 | 7/2003 | Eguchi et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,869,057 B2 | 3/2005 | Matsumoto et al. |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,156,463 B2 | 1/2007 | Taubmann et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |

(56) References Cited

U.S. PATENT DOCUMENTS

| | | |
|---|---|---|
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,408,631 B2 | 4/2013 | Sandmann et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,578 B2 | 6/2014 | Kitamura et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,399,412 B2 | 7/2016 | Kanai |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,879,458 B2 | 1/2018 | Gabriel et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0236899 A1 | 10/2005 | Kazmierczak |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2011/0225773 A1 | 9/2011 | Hearn et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2013/0153735 A1 | 6/2013 | Ruthman et al. |
| 2013/0341479 A1 | 12/2013 | Yamada et al. |
| 2014/0110554 A1 | 4/2014 | Oya et al. |
| 2014/0224954 A1 | 8/2014 | Oh et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0052819 A1 | 2/2015 | Lee |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2015/0298580 A1 | 10/2015 | Kanai |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0058122 A1 | 3/2018 | Lang |
| 2018/0072188 A1 | 3/2018 | Yamada |
| 2018/0086230 A1 | 3/2018 | Kume et al. |
| 2018/0086232 A1 | 3/2018 | Kume |
| 2018/0105072 A1 | 4/2018 | Pons |
| 2018/0126875 A1 | 5/2018 | Kume et al. |
| 2018/0148011 A1 | 5/2018 | Zaugg et al. |
| 2018/0154799 A1 | 6/2018 | Lota |
| 2018/0183623 A1 | 6/2018 | Schoenfeld et al. |
| 2018/0244175 A1 | 8/2018 | Tan |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0010001 A1 | 1/2020 | Pinkelman et al. |
| 2020/0047641 A1 | 2/2020 | D'Eramo et al. |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0247275 A1 | 8/2020 | Yetukur et al. |
| 2020/0262367 A1 | 8/2020 | Fernandez Banares et al. |

(56) References Cited

U.S. PATENT DOCUMENTS

| | | |
|---|---|---|
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2021/0101562 A1 | 4/2021 | Ricart et al. |
| 2021/0105011 A1 | 4/2021 | Ricart et al. |
| 2021/0105012 A1 | 4/2021 | Ricart et al. |
| 2021/0107419 A1 | 4/2021 | Ricart et al. |
| 2021/0129710 A1 | 5/2021 | Petit et al. |
| 2021/0129778 A1 | 5/2021 | Fernandez Banares et al. |

FOREIGN PATENT DOCUMENTS

| | | | |
|---|---|---|---|
| CN | 104648190 | A | 5/2015 |
| CN | 106994917 | A | 8/2017 |
| CN | 107706680 | A | 2/2018 |
| DE | 19509344 | A1 | 9/1996 |
| DE | 19602250 | A1 | 7/1997 |
| DE | 10143721 | A1 | 3/2003 |
| DE | 60100054 | T2 | 7/2003 |
| DE | 202005013714 | U1 | 12/2005 |
| DE | 102005007430 | A1 | 3/2006 |
| DE | 102006022032 | A1 | 12/2006 |
| DE | 102009059126 | A1 | 7/2010 |
| DE | 102010017038 | A1 | 2/2011 |
| DE | 102011002656 | A1 | 9/2011 |
| DE | 102011056278 | A1 | 2/2013 |
| DE | 202014102336 | U1 | 6/2014 |
| DE | 102015212100 | A1 | 12/2015 |
| DE | 102016113409 | A1 | 4/2017 |
| DE | 102015221077 | A1 | 5/2017 |
| DE | 102017210396 | A1 | 12/2017 |
| DE | 102019206304 | A1 | 11/2019 |
| DE | 102019206411 | A1 | 11/2019 |
| DE | 102020128572 | A1 | 5/2021 |
| DE | 102019135631 | A1 * | 6/2021 |
| EP | 0090235 | A2 | 10/1983 |
| EP | 0783990 | A1 | 7/1997 |
| EP | 1176047 | A1 | 1/2002 |
| EP | 2298609 | B1 | 3/2011 |
| EP | 3150426 | A1 | 4/2017 |
| EP | 3456579 | A1 | 3/2019 |
| FR | 2762814 | A1 | 11/1998 |
| FR | 2951329 | A1 | 4/2011 |
| FR | 2986751 | A1 | 8/2013 |
| JP | 2001500307 | A * | 9/2001 |
| JP | 3314591 | B2 | 8/2002 |
| JP | 2003227703 | A | 8/2003 |
| JP | 2005119518 | A | 5/2005 |
| JP | 2007112174 | A | 5/2007 |
| JP | 2008158578 | A | 7/2008 |
| JP | 4222262 | B2 | 2/2009 |
| JP | 2009200023 | A | 9/2009 |
| JP | 2013230721 | A | 11/2013 |
| WO | 01/87665 | A1 | 11/2001 |
| WO | 2003002256 | A2 | 1/2003 |
| WO | 2005/068247 | A2 | 7/2005 |

OTHER PUBLICATIONS

Co-Pending U.S. Appl. No. 17/078,706, filed Oct. 23, 2020.
Co-Pending U.S. Appl. No. 17/116,959, filed Dec. 9, 2020.
Co-Pending U.S. Appl. No. 17/179,147, filed Feb. 18, 2021.
Co-Pending U.S. Appl. No. 17/179,159, filed Feb. 18, 2021.
Co-Pending U.S. Appl. No. 17/179,166, filed Feb. 18, 2021.
Co-Pending U.S. Appl. No. 17/179,170, filed Feb. 18, 2021.
Co-Pending U.S. Appl. No. 17/179,176, filed Feb. 18, 2021.

* cited by examiner

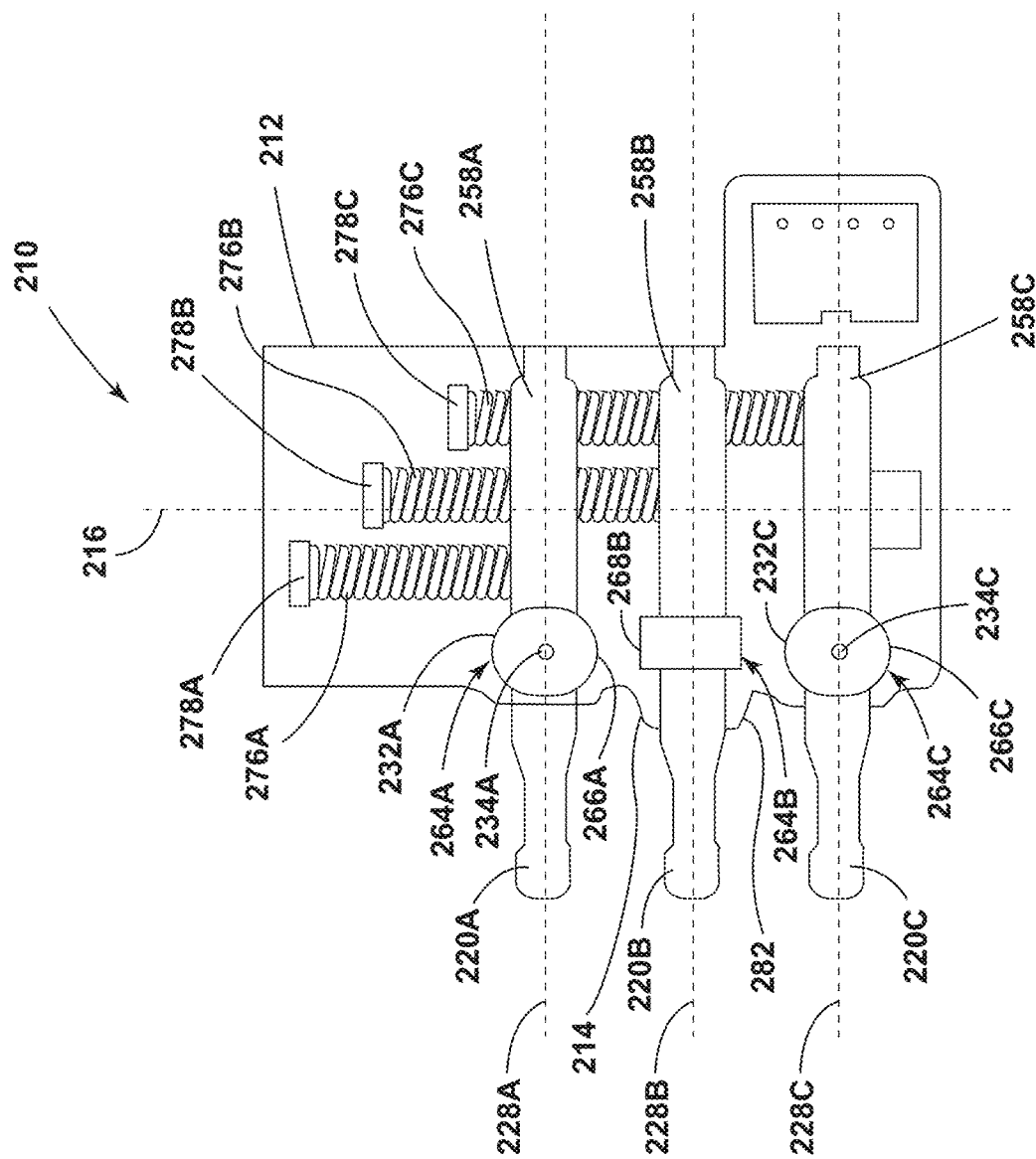
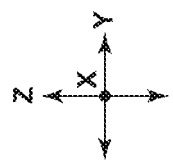
FIG. 6A

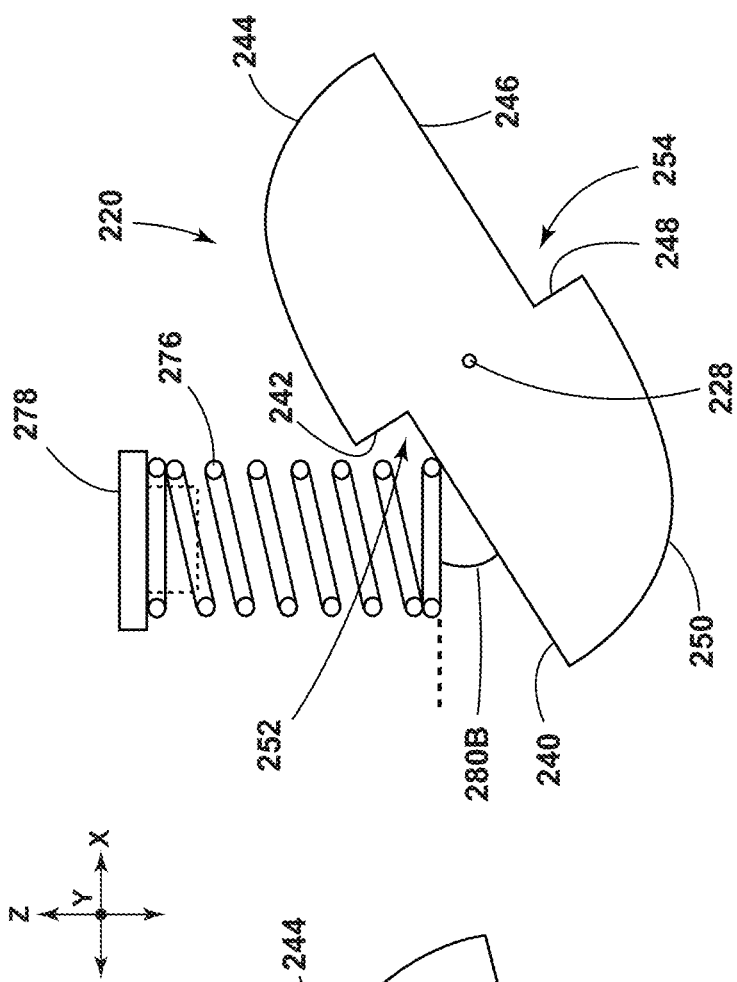
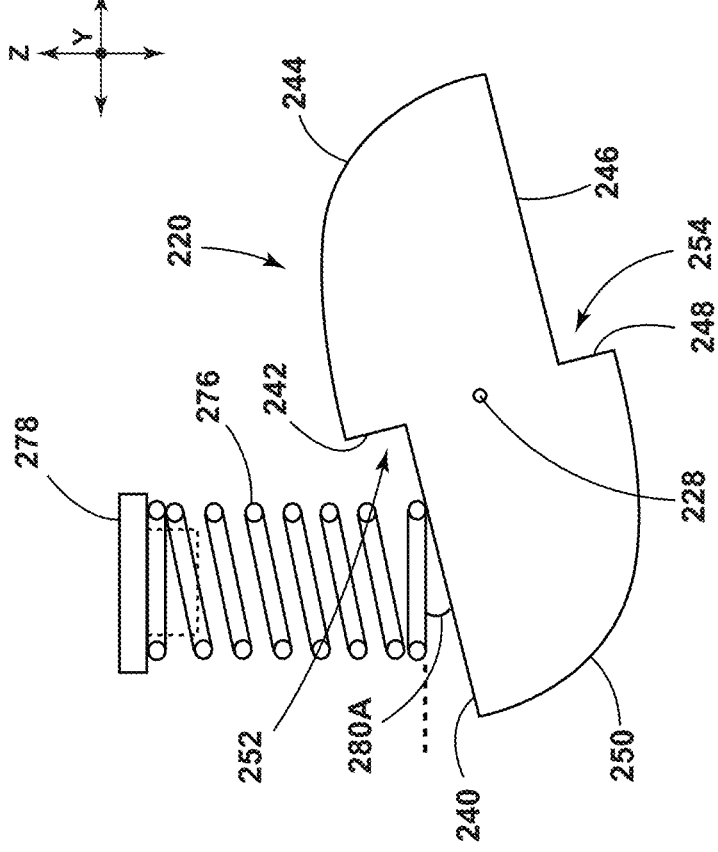
FIG. 9B
FIG. 9A

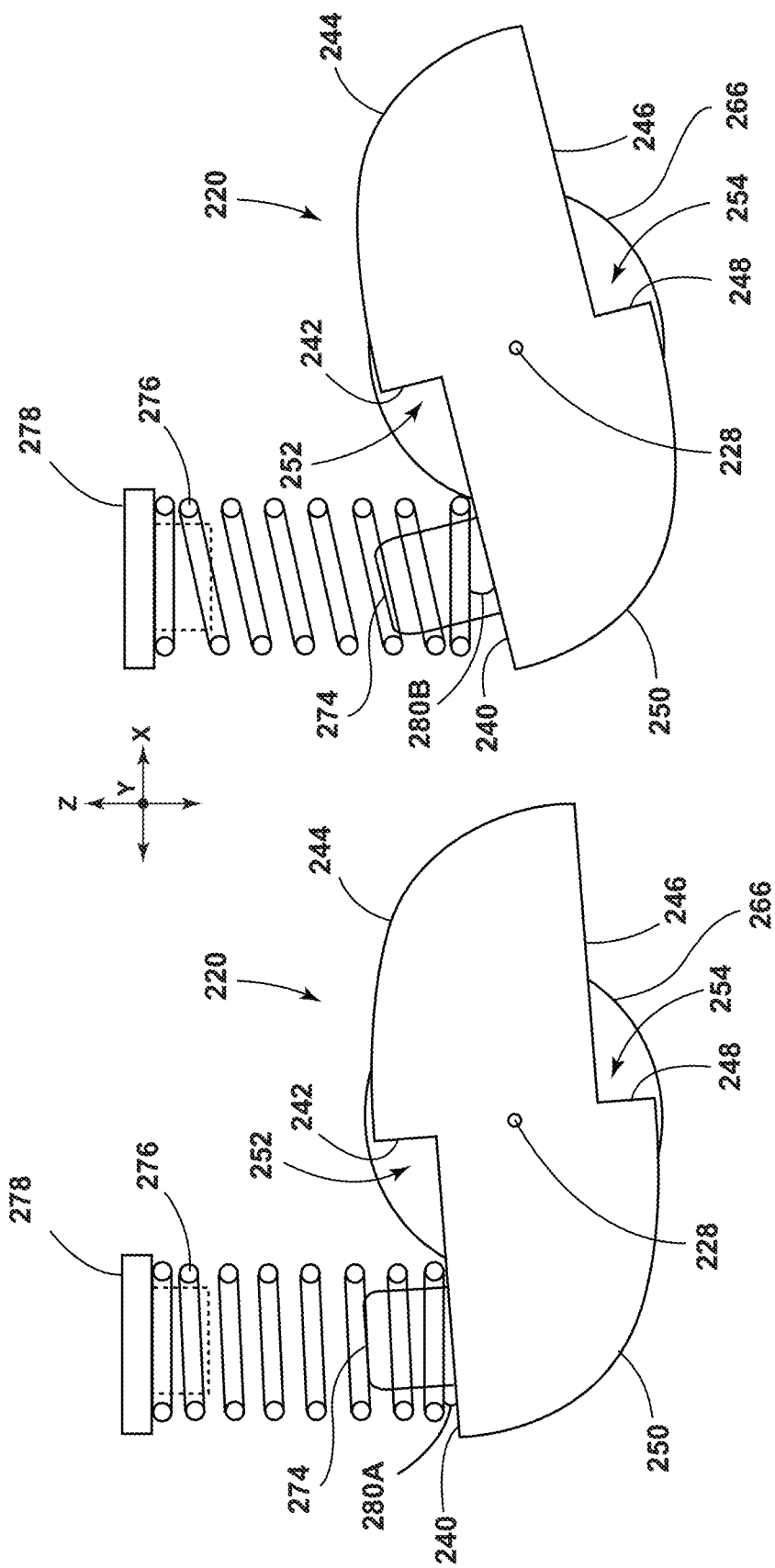

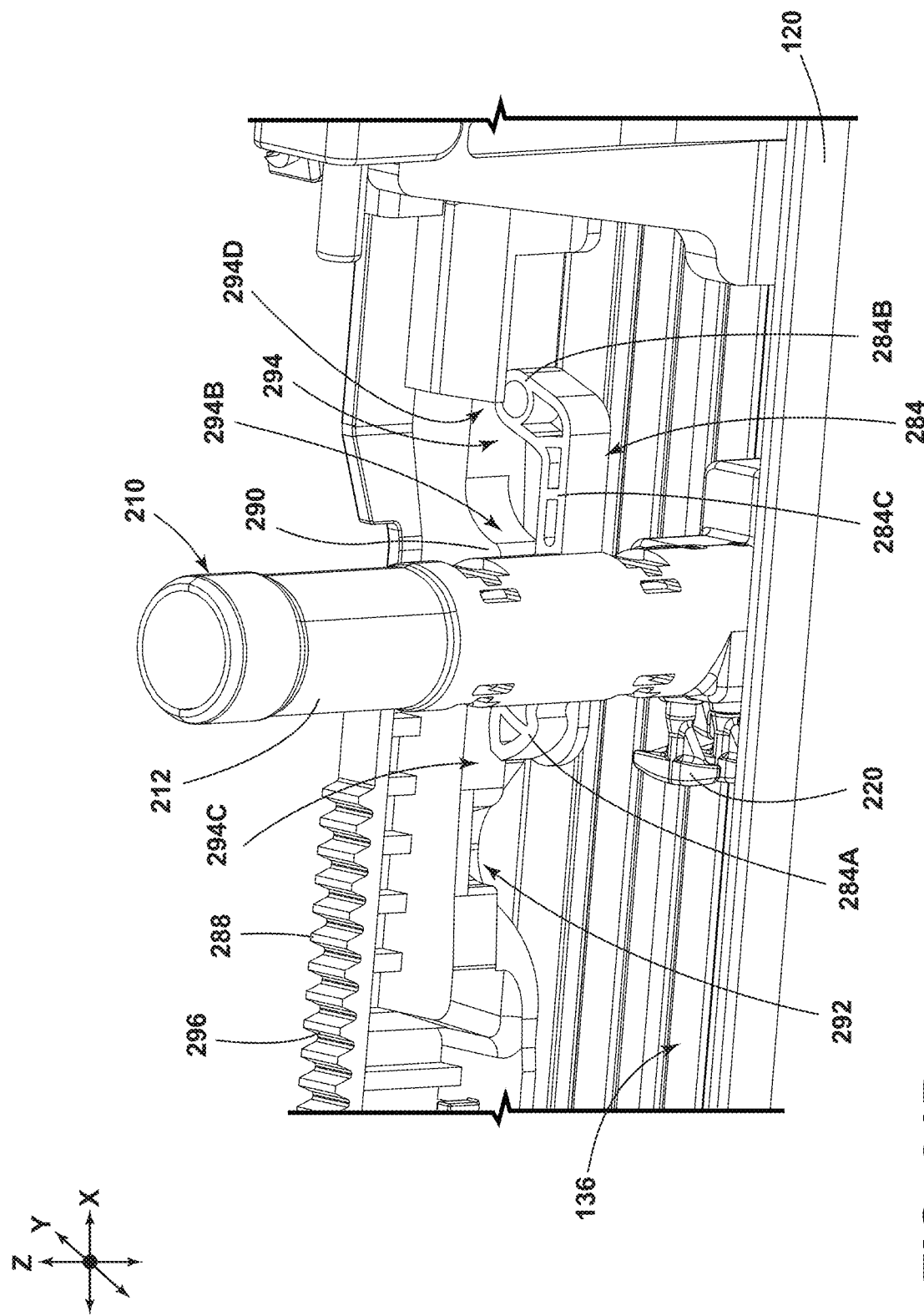

TRACK SYSTEM WITH A SUPPORT MEMBER

CROSS-REFERENCE TO RELATED APPLICATION

This application claims the benefit of U.S. Provisional Patent Application Ser. No. 62/979,812, filed on Feb. 21, 2020, the disclosure of which is hereby incorporated by reference in its entirety as though fully set forth herein.

TECHNICAL FIELD

The present disclosure generally relates to a track system and/or support members configured for connection with and removal from tracks, including support members and tracks that may, for example, be utilized in connection with vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track systems may have support members that may not provide sufficient functionality, may be complex to operate and/or assemble, and/or may not operate efficiently. For example, some support members may not provide a sufficient connection between an electrical contact and a corresponding conductor of a track.

There is a desire for solutions/options that minimize or eliminate one or more challenges or shortcomings of support members configured for connection with and removal from tracks. The foregoing discussion is intended only to illustrate examples of the present field and is not a disavowal of scope.

SUMMARY

In embodiments, a support member may be connectable in a removable and adjustable manner to a track assembly. The support member may include an electrical connector, a contact, and a biasing member. The electrical connector may be adjustable to a first position and a second position. The contact may be connected to the electrical connector and configured to engage a conductor of said track assembly. The contact may be engageable with said conductor when the electrical connector is in the first position. The contact may not be engageable with said conductor when the electrical connector is in the second position. The biasing member may be configured to bias the contact into engagement with said conductor when the electrical connector is in the first position.

In embodiments, a track system may include a track assembly and a support assembly. The track assembly may include a conductor. The support assembly may include a support member connectable in a removable and adjustable manner to the track assembly. The support member may include an electrical connector, a contact, and a biasing member. The electrical connector may be adjustable to a first position and a second position. The contact may be connected to the electrical connector and configured to engage the conductor of the track assembly. The contact and the conductor may be engageable with one another when the electrical connector is in the first position. The contact and the conductor may not be engageable with one another when the electrical connector is in the second position. The biasing member may be configured to bias the contact into engagement with the conductor when the electrical connector is in the first position.

In embodiments, a track system may include a track assembly and a support assembly. The track assembly may include a plurality of conductors. The support assembly may include a support member connectable in a removable and adjustable manner to the track assembly. The support member may include an electrical connector, a plurality of contacts, and a plurality of biasing members. The electrical connector may be adjustable to a first position and a second position. The plurality of contacts may be connected to the electrical connector and may be configured to engage a corresponding conductor of the plurality of conductors. The plurality of contacts and the plurality of conductors may be engageable with one another when the electrical connector is in the first position. The plurality of contacts and the plurality of conductors may not be engageable with one another when the electrical connector is in the second position. The plurality of biasing members may be configured to bias a corresponding contact of the plurality of contacts into engagement with the corresponding conductor when the electrical connector is in the first position.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIG. 6A is a cross sectional front view generally illustrating an embodiment of an electrical connector in a first position according to teachings of the present disclosure.

FIGS. 9A and 9B generally illustrate embodiments of an electrical contact in a first rotational position and a second rotational position, respectively, according to teachings of the present disclosure.

FIGS. 10A and 10B generally illustrate embodiments of an electrical contact in a first rotational position and a second rotational position, respectively, according to teachings of the present disclosure.

FIGS. 21A and 21B are views generally illustrating an embodiment of an electrical connector including an adjustment portion in a second position according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
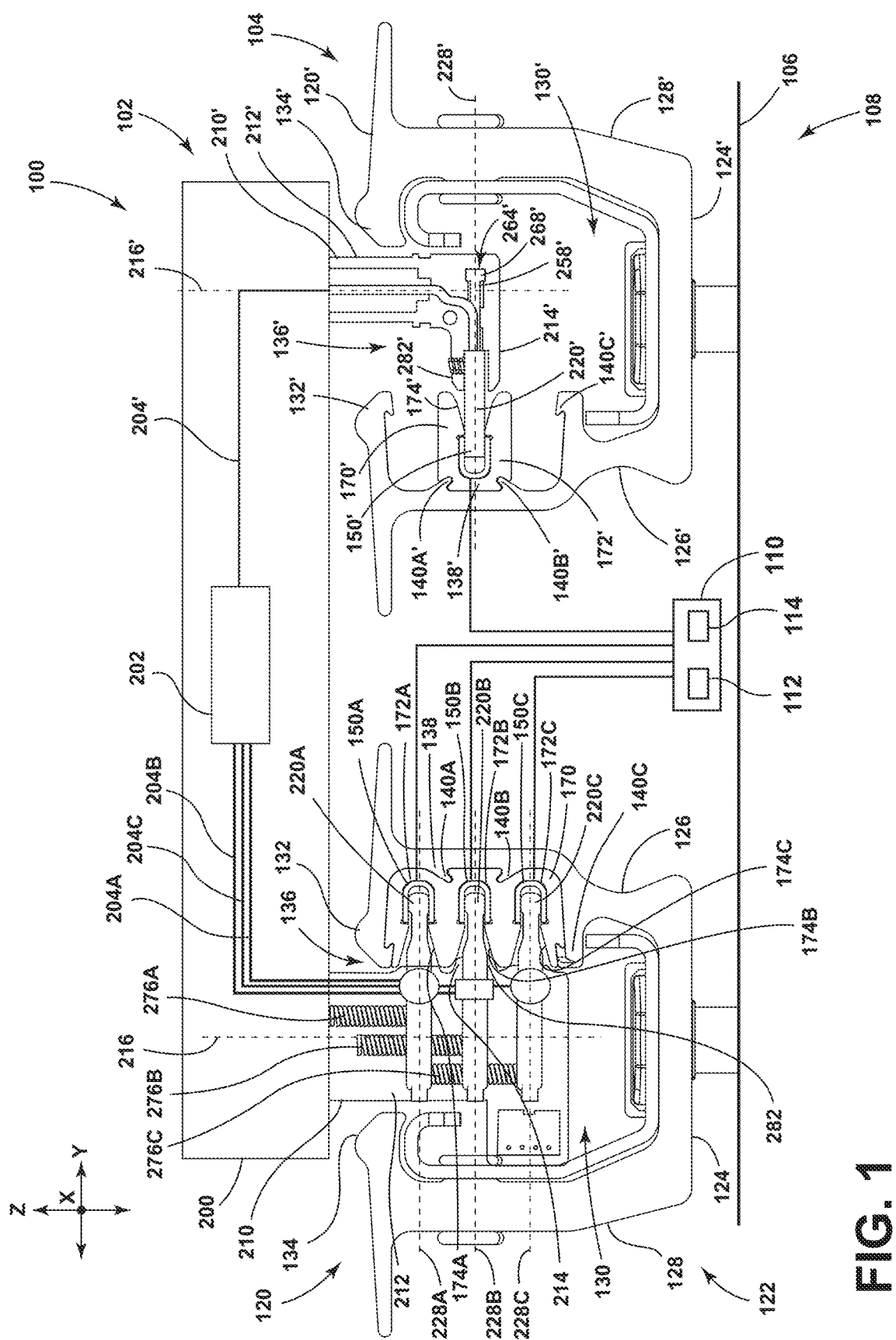
FIG. 1 is a cross sectional view generally illustrating an embodiment of a track system according to teachings of the present disclosure.

In embodiments, such as generally illustrated in FIG. 1, a track system 100 may include a support assembly 102 and/or a track/rail assembly 104. A track assembly 104 may be connected to and/or disposed in a mounting surface 106 (e.g., a floor of a vehicle 108) and may facilitate selective connection of one or more support assemblies to the mounting surface 106. A track assembly 104 may facilitate adjustment of one or more support assemblies 102, such as relative to the mounting surface 106 and/or within a vehicle 108. A support assembly 102 and/or a track assembly 104 may include and/or be connected to an electrical system 110 (e.g., of a vehicle 108), which may include a controller 112 and/or a power source 114.

In embodiments, such as generally illustrated in FIG. 1, a track assembly 104 may include one or more tracks/rails 120 to which a support assembly 102 may be connectable and adjustable (e.g., slidable). A track 120 may include one or more metal and/or conductive materials (e.g., steel, aluminum, etc.). A track assembly 104 may include one or more track sets 122, each including one or more tracks 120 that may be configured to engage a corresponding portion of a support assembly 102. Several tracks 120 and/or track sets 122 may be connected to a portion of the mounting surface 106 (e.g., a floor, wall, ceiling, etc.) and disposed adjacent to one another and/or may extend parallel to one another. One or more tracks 120, 120' may be structured identically to one other and/or differently from one another. Tracks 120, 120' may, for example, be offset from each other in a lateral/transverse direction (e.g., a Y-direction) such that the tracks 120, 120' may be generally aligned with respective outer sides of the support assembly 102.

Figure 2:
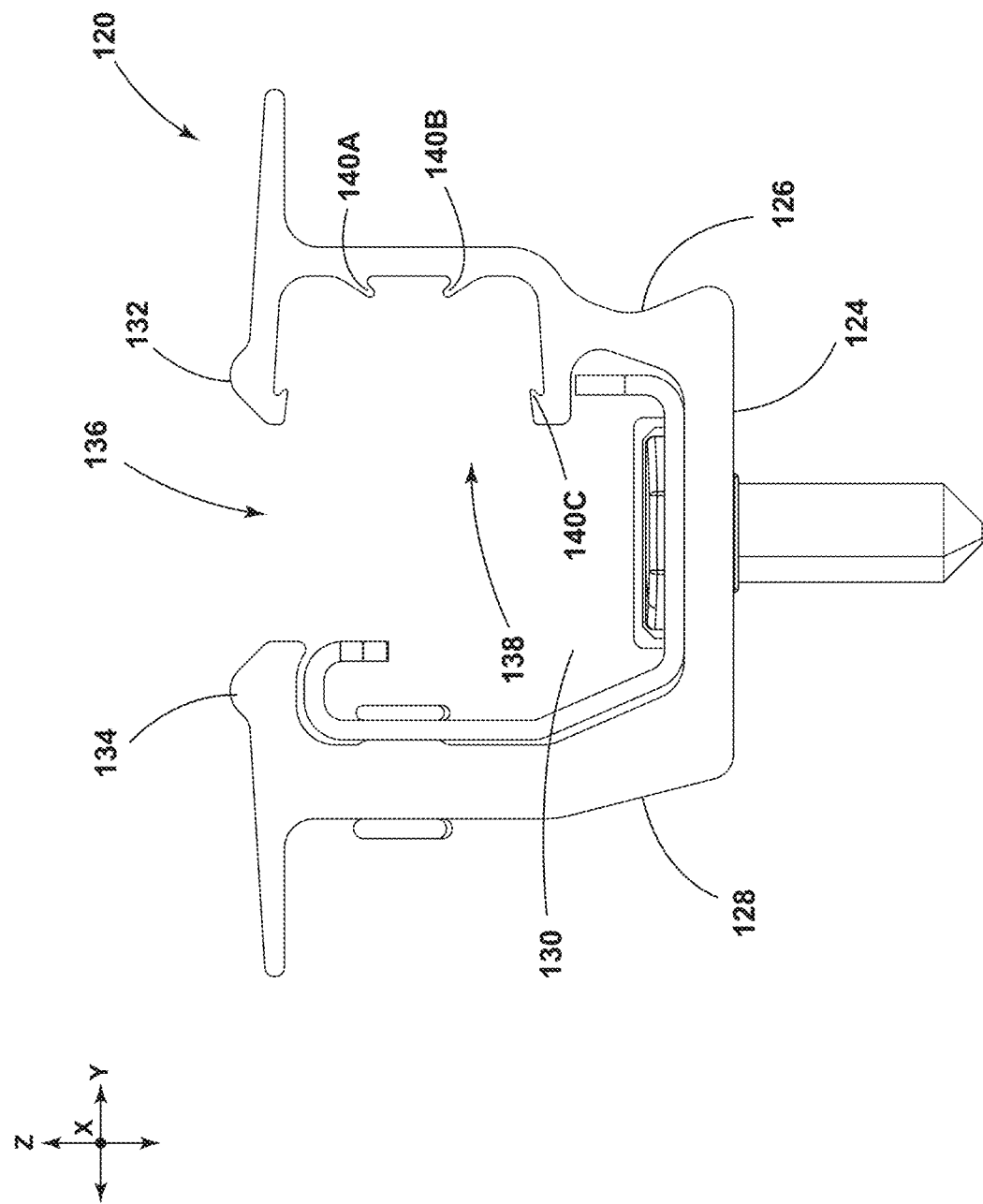
FIG. 2 is a cross-sectional view generally illustrating an embodiment of a track according to teachings of the present disclosure.

With embodiments, such as generally illustrated in FIG. 2, a track 120 may be an elongated member extending in the X-direction. A track 120 may have a track base portion 124 and two track wall portions (e.g., a first track wall portion 126 and a second track wall portion 128) protruding from the track base portion 124 to form a generally U shaped cross-section in a Y-Z plane (e.g., in a plane perpendicular to an X-direction). The U-shaped cross section may define a track receptacle 130 configured to receive and at least temporarily retain a portion of a support assembly 102. A first track lip 132 and a second track lip 134 may project toward one another from the first track wall portion 126 and the second track wall portion 128, respectively. A track opening 136 may be defined between the two track lips 132, 134. A portion of a support assembly 102 may be inserted into the track opening 136 and selectively retained within the track receptacle 130. A track 120 may include an insulator receptacle 138 configured to receive and retain an insulator 170. An insulator receptacle 138 may open substantially in a Y-direction. An insulator receptacle 138, 138' may be defined by a track wall portion 126, 128, a track lip 132, 134, and/or one or more track projections 140A, 140B, 140C extending from a track wall portion 126, 128. Additionally and/or alternatively, an insulator receptacle 138 may be defined by a track wall portion 126, 128, a track lip 132, 134, and/or a track base portion 124.

Figure 3:
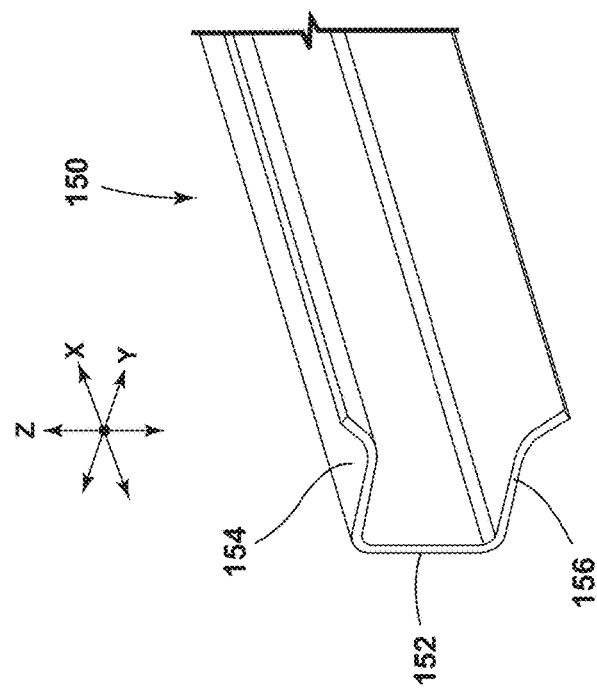
FIG. 3 is a perspective view generally illustrating an embodiment of a conductor according to teachings of the present disclosure.
Figure 17A:
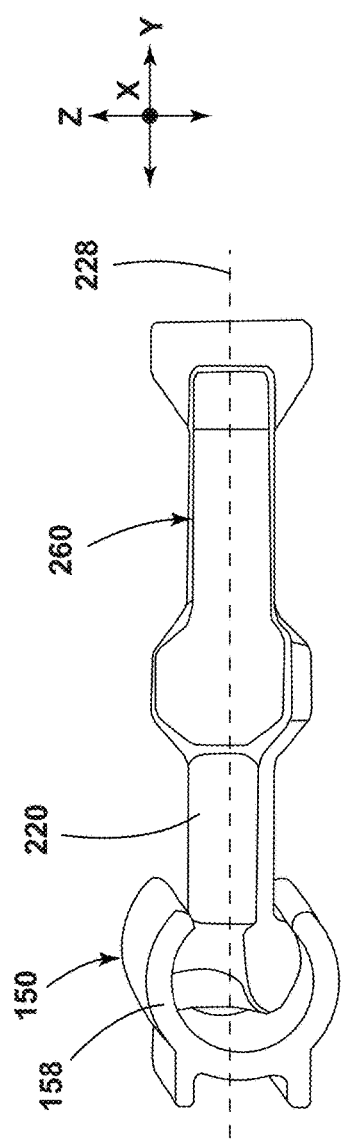
FIG. 17A is a perspective view generally illustrating an embodiment of an electrical contact engaged with a conductor according to teachings of the present disclosure.
Figure 17B:
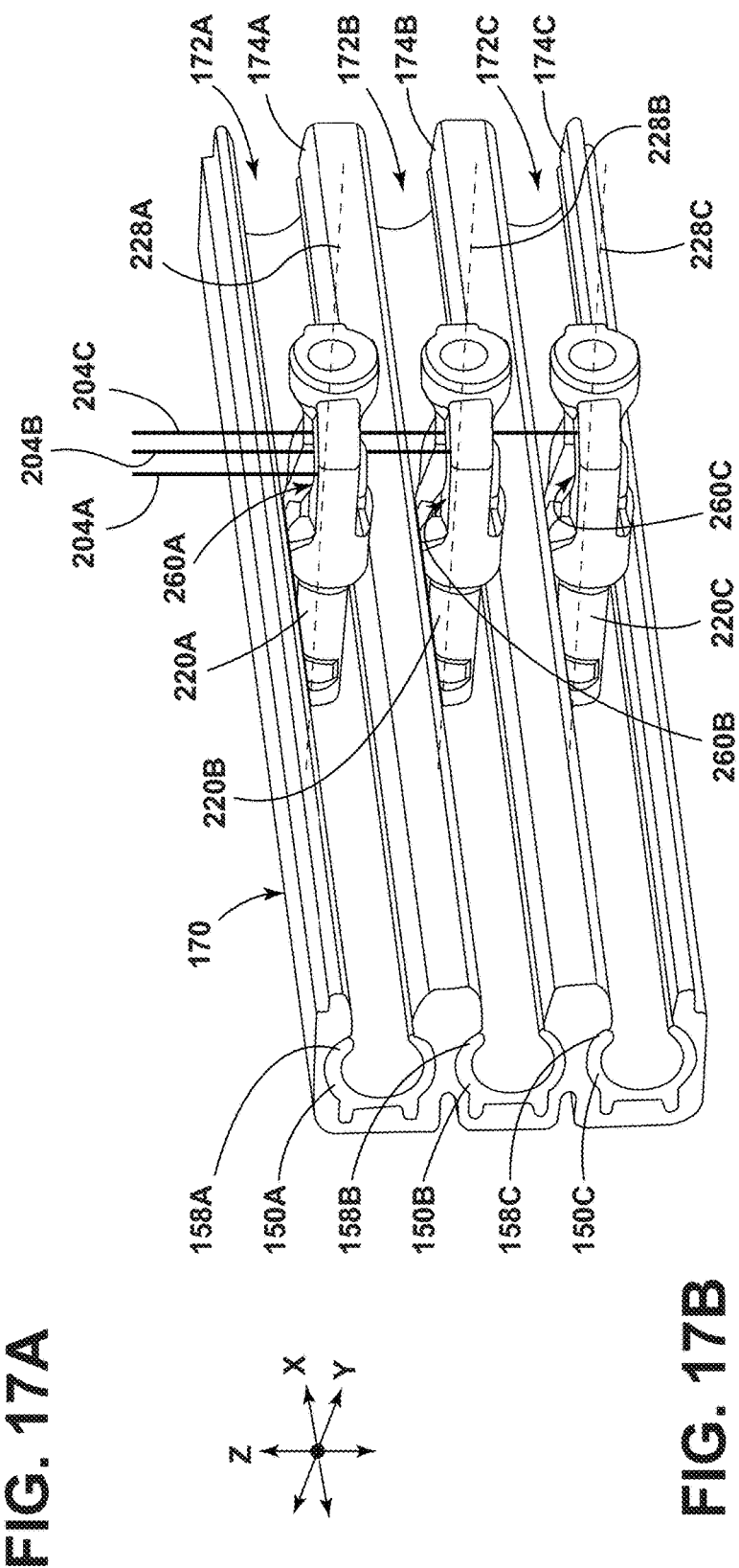
FIG. 17B is a perspective view generally illustrating an embodiment of a plurality of electrical contacts engaged with respective conductors according to teachings of the present disclosure.
Figure 18A:
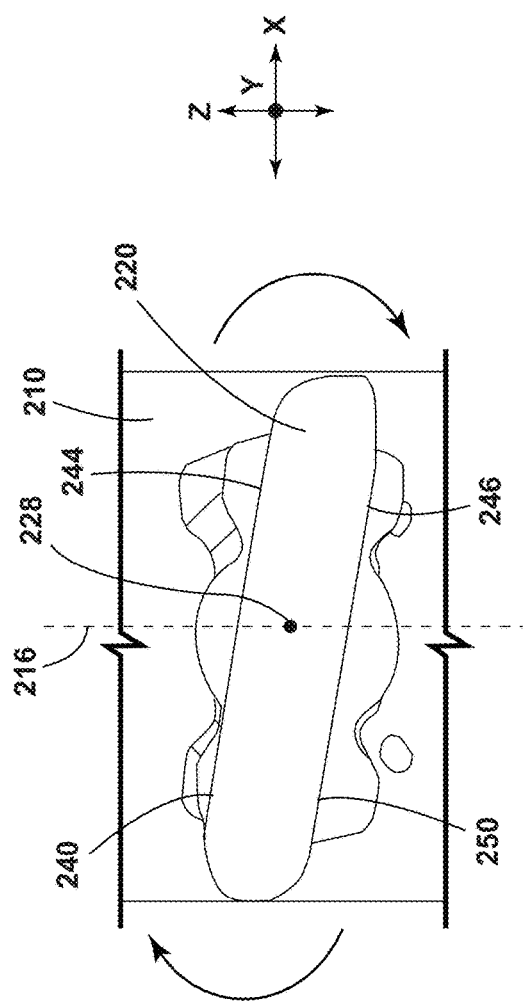
FIG. 18A is a side view generally illustrating rotational movement of an embodiment of an electrical contact according to teachings of the present disclosure.
Figure 18B:
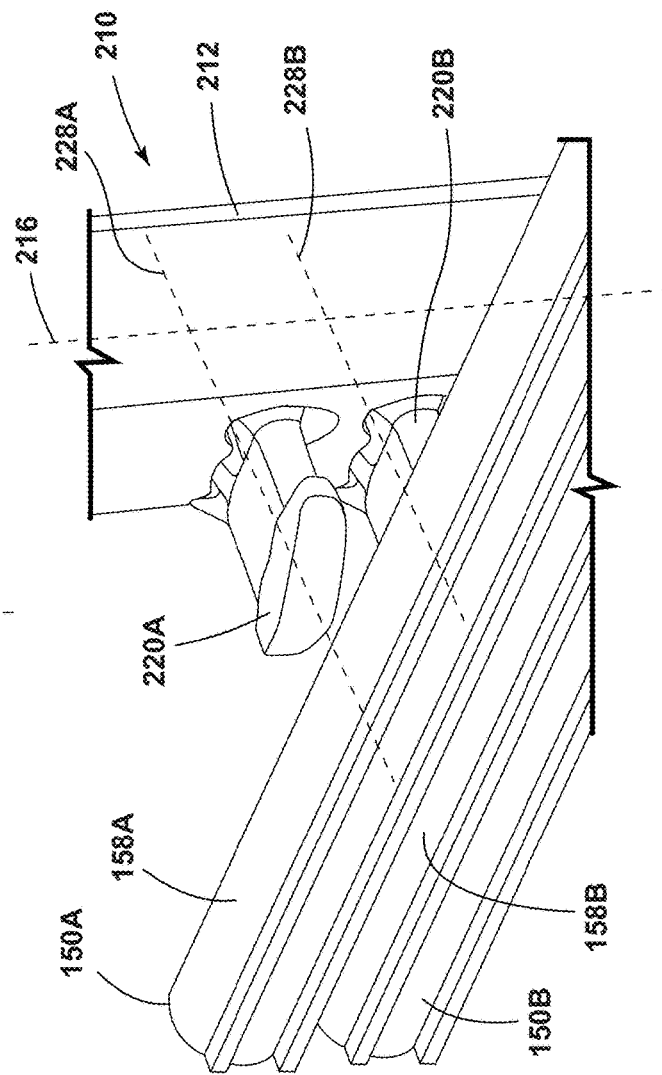
FIG. 18B is a perspective view generally illustrating an embodiment of an electrical connector with a plurality of electrical contacts and embodiments of conductors according to teachings of the present disclosure.
Figure 19:
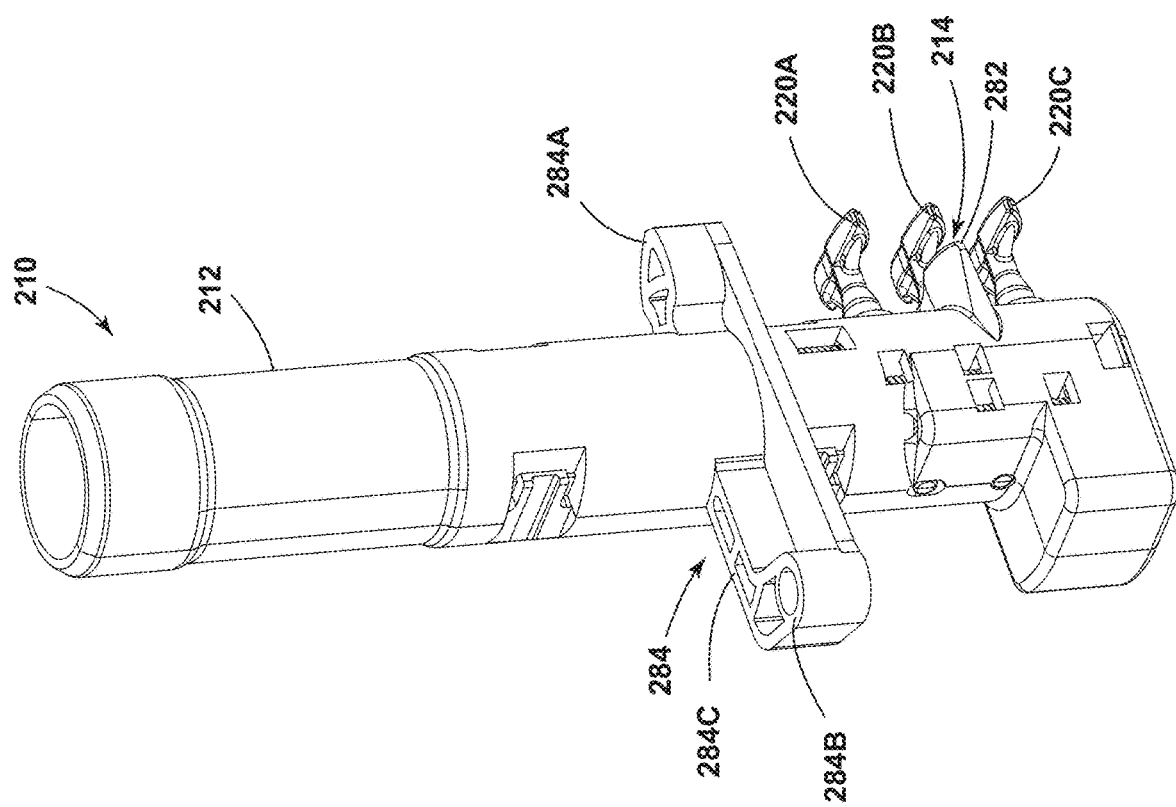
FIG. 19 is a view generally illustrating an embodiment of an electrical connector including an adjustment portion according to teachings of the present disclosure.
Figure 20A:
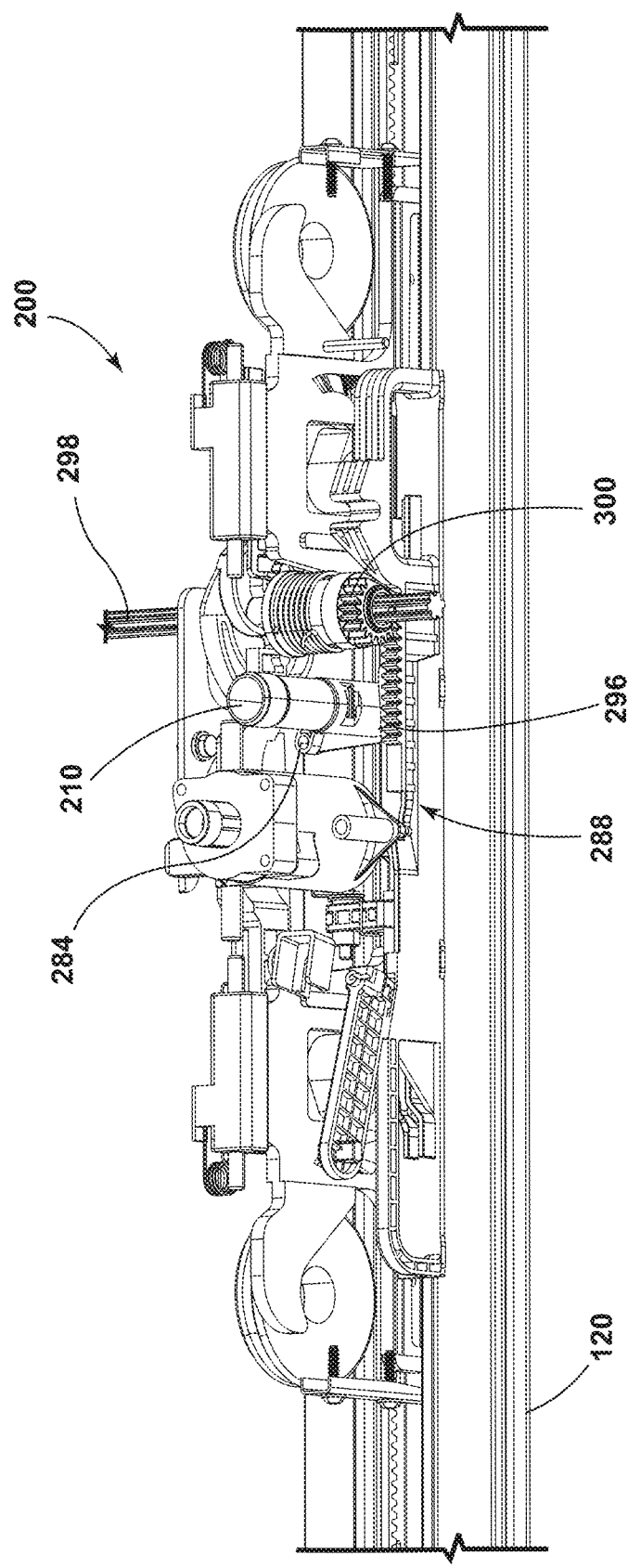
FIG. 20A is a view generally illustrating an embodiment of support member according to teachings of the present disclosure.
Figure 20B:
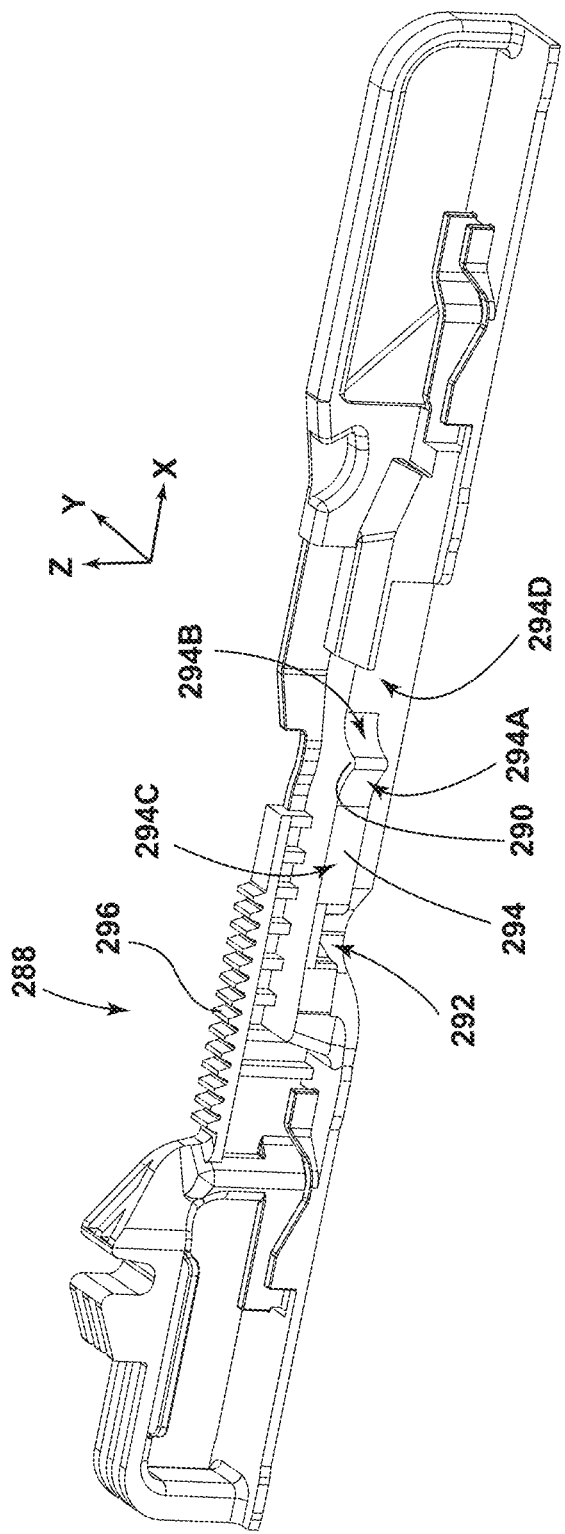
FIG. 20B is a view generally illustrating an embodiment of a slider according to teachings of the present disclosure.

In embodiments, such as generally illustrated in FIGS. 1 and 3, a track 120 may include one or more electrical conductors 150 (e.g., bus bars). A conductor 150 may be operatively connected to a controller 112 and/or a power source 114. A conductor 150 may be connected to a first track wall portion 126 and/or a second track wall portion 128 of a track 120, and/or any other portion of a track 120. A conductor 150 may be disposed and connected to a track 120 such that the conductor 150 is able to make contact with (e.g., electrically connect with) a corresponding electrical contact 220 of a support assembly 102. With examples, a conductor 150 may be an elongated member extending in the X-direction. A conductor 150 may have a conductor base portion 152 and two conductor wall portions (e.g., a conductor top portion 154 and a conductor bottom portion 156) protruding from the conductor base portion 152 to form a generally U-shaped cross-section in a Y-Z plane that opens substantially in the Y-direction. In examples, such as generally illustrated in FIG. 17B, a conductor 150 may have a singular, curved wall portion 158 and/or may generally have a C-shaped cross-section. When engaged by an electrical contact 220, a curved wall portion 158 and/or a C-shaped cross-section of a conductor 150 may guide and/or bias the electrical contact 220 toward a centralized position, in which a contact surface area between the electrical contact 220 and the conductor 160 may be greatest, and/or may facilitate alignment of the electrical contact 220 relative to a Y-direction and/or a Z-direction.

With embodiments, such as generally illustrated in FIGS. 1, 15B, 16A, 16B, and/or 17B, a track 120 may include a plurality of conductors 150, such as a first conductor 150A, a second conductor 150B, and/or a third conductor 150C. The first, second, and third conductors 150A, 150B, 150C may be arranged in a stacked configuration such that they are substantially aligned when viewed from a Z-direction and/or extend parallel to one another in the X-direction.

Figure 4:
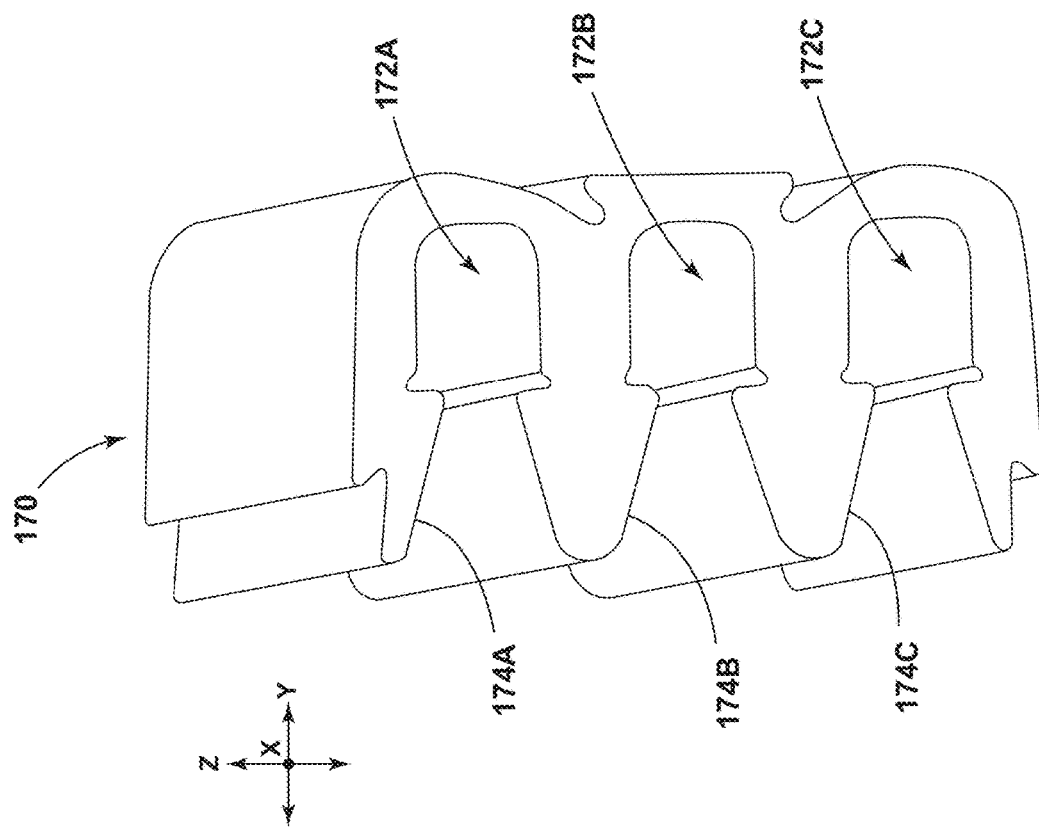
FIG. 4 is a perspective view generally illustrating an embodiment of an insulator according to teachings of the present disclosure.

With embodiments, such as generally illustrated in FIGS. 1 and 4, a track 120 may include an insulator 170, that may, for example, include electrically insulative material. An insulator 170 may include a body/structure configured to receive and/or retain one or more conductors 150. An insulator 170 may be electrically insulative and/or may be configured to electrically insulate/isolate a conductor 150 from other portions of the track 120 and/or track assembly 104. An insulator 170 may be an elongated body that may extend in the X-direction. An insulator 170 may include one or more insulator recesses 172 configured to receive one or more conductors 150. A conductor 150 may slide and/or snap, for example, into an insulator recess 172. An insulator recess 172 may open in a Y-direction and/or may include a tapered opening 174 configured to engage one or more alignment protrusions 282 and/or electrical contacts 220 of an electrical connector 210, such as to guide the electrical contacts 220 into engagement, contact, and/or abutment with a corresponding conductor 150 and/or to facilitate proper alignment of an electrical connector 210 and/or the electrical contact 220 in the Z-direction. The insulator 170 may be disposed within the track receptacle 130 and/or may be connected to the first track wall portion 126 and/or the second track wall portion 128, and/or another portion of the track 120. The insulator 170 may be slid and/or snapped into an insulator receptacle 138 of a track 120.

With embodiments, such as generally illustrated in FIGS. 4, 15B, 16A, 16B, and/or 17B, an insulator 170 may include a plurality of insulator recesses 172 and/or a plurality of tapered openings 174, such as a first insulator recess 172A, a second insulator recess 172B, and/or a third insulator recess 172C that may each have a respective tapered opening 174A, 174B, 174C. The first insulator recess 172A, the second insulator recess 172B, and the third insulator recess 172C may be configured to receive and/or retain a first conductor 150A, a second conductor 150B, and/or a third conductor 150C, respectively. The first, second, and third insulator recesses 172A, 172B, 172C may be arranged in a stacked configuration such that they are substantially aligned when viewed from a Z-direction and/or extend parallel to one another in the X-direction.

In embodiments, such as generally illustrated in FIG. 1, a track assembly 104 may include a track set 122 including a first track 120 and a second track 120'. The first track 120 may include a track base portion 124, a first track wall portion 126, a second track wall portion 128, a first track lip 132, a second track lip 134, a track receptacle 130, a track opening 136, an insulator receptacle 138, and/or a plurality of track projections 140A, 140B, 140C. The first track 120 may include an insulator 170 with a plurality of insulator recesses 172A, 172B, 172C and/or a plurality of electrical conductors 150A, 150B, 150C. The second track 120' may include a track base portion 124', a first track wall portion 126', a second track wall portion 128', a first track lip 132', a second track lip 134', a track receptacle 130', a track opening 136', and/or a plurality of track projections 140A', 140B', 140C', some or all of which may be configured in the same or similar manner as corresponding features of the first track 120. The second track 120' may include an insulator receptacle 138' defined by a track wall portion 126' and track projections 140A', 140B'. The second track 120' may include an insulator 170' with a single insulator recess 172', a single tapered opening 174', and a single conductor 150'. In other examples, the first track 120 and/or the insulator 170 may include the same or a similar configuration (e.g., a mirrored configuration) as the second track 120' and/or the insulator 170', or vice versa.

With embodiments, such as generally illustrated in FIG. 1, a support assembly 102 may include a support member 200. A support assembly 102 and/or a support member 200 may be adjusted and/or moved along a track 120 and/or the track assembly 104 (e.g., in an X-direction) manually and/or via an actuator (e.g., an electric motor operatively connected to the support assembly 102 and/or the track assembly 104). A support member 200 may be configured for connection with and removal (e.g., in a Z-direction) from a track assembly 104, such as in a plurality of locations along the track assembly 104. A support member 200 may, for example and without limitation, include, be connected to, and/or support a seat, such as a vehicle seat, and/or one or more other components (e.g., consoles, cargo, cargo racks, etc.). The support member 200 and/or one or more components connected thereto may include one or more electrical components 202 (e.g., controllers, power sources, seat heaters, airbags, air bladders, fans, etc.). A support member 200 may be configured as a base, a leg, and/or a support structure, for example.

With embodiments, such as generally illustrated in FIG. 1, a support member 200 may include one or more electrical connectors 210 that may be configured for selective connection with a track 120 of a track assembly 104. An electrical connector 210 may be configured to selectively electrically connect with a track assembly 104, such as with a conductor 150 (e.g., a bus bar) of the track assembly 104. Electrical connection between an electrical connector 210 and a conductor 150 may permit electrical power and/or one or more signals (e.g., control signals, sensor data signals, etc.) to be provided to and/or received from the support member 200 (e.g., an electrical component 202), such as via wires 204. An electrical connector 210 (and/or a housing thereof) may, for example, include an electrically insulative material (e.g., plastic, polymer, etc.).

Figure 5:
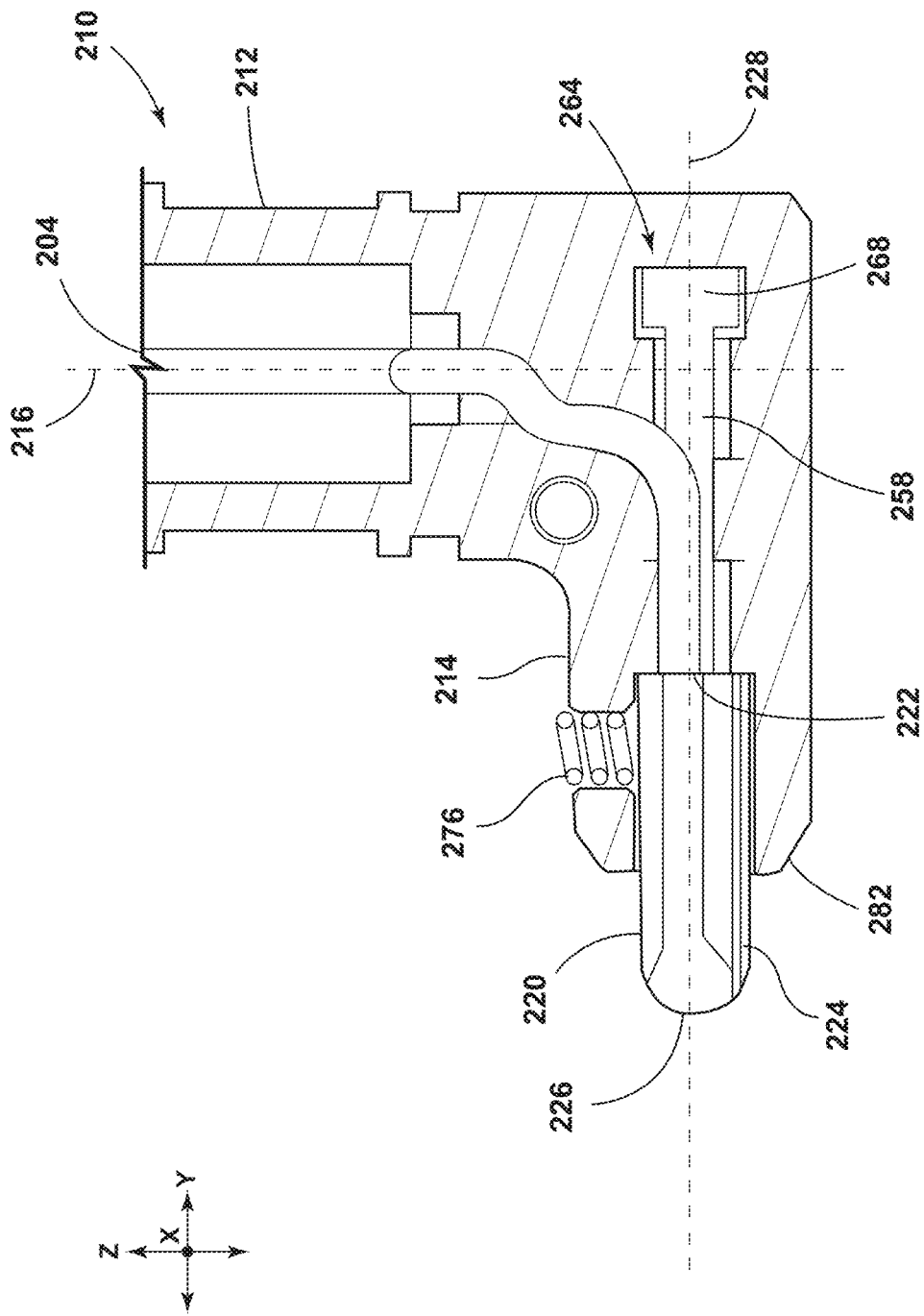
FIG. 5 is a cross sectional view generally illustrating an embodiment of an electrical connector in a first position according to teachings of the present disclosure.
Figure 6B:
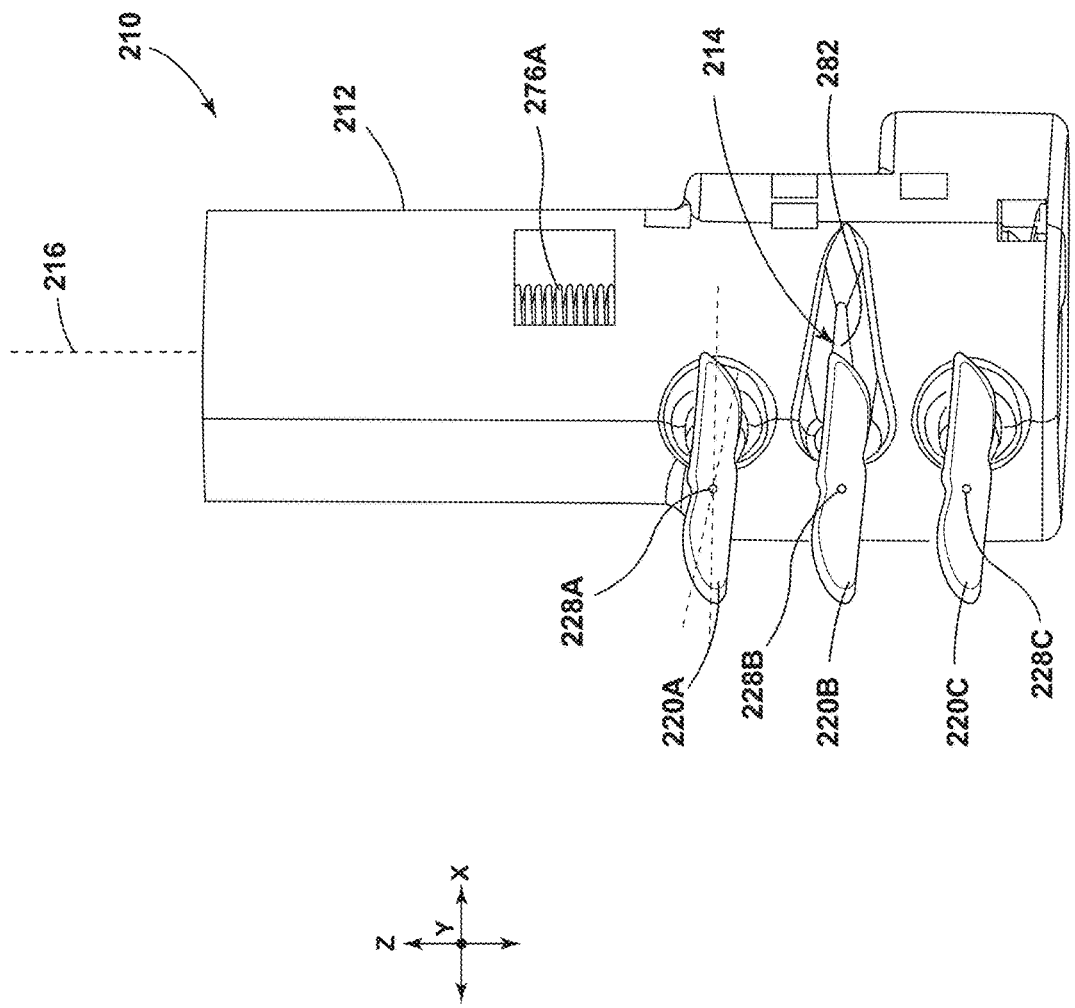
FIG. 6B is a side view generally illustrating the embodiment of an electrical connector of FIG. 6A.
Figure 6C:
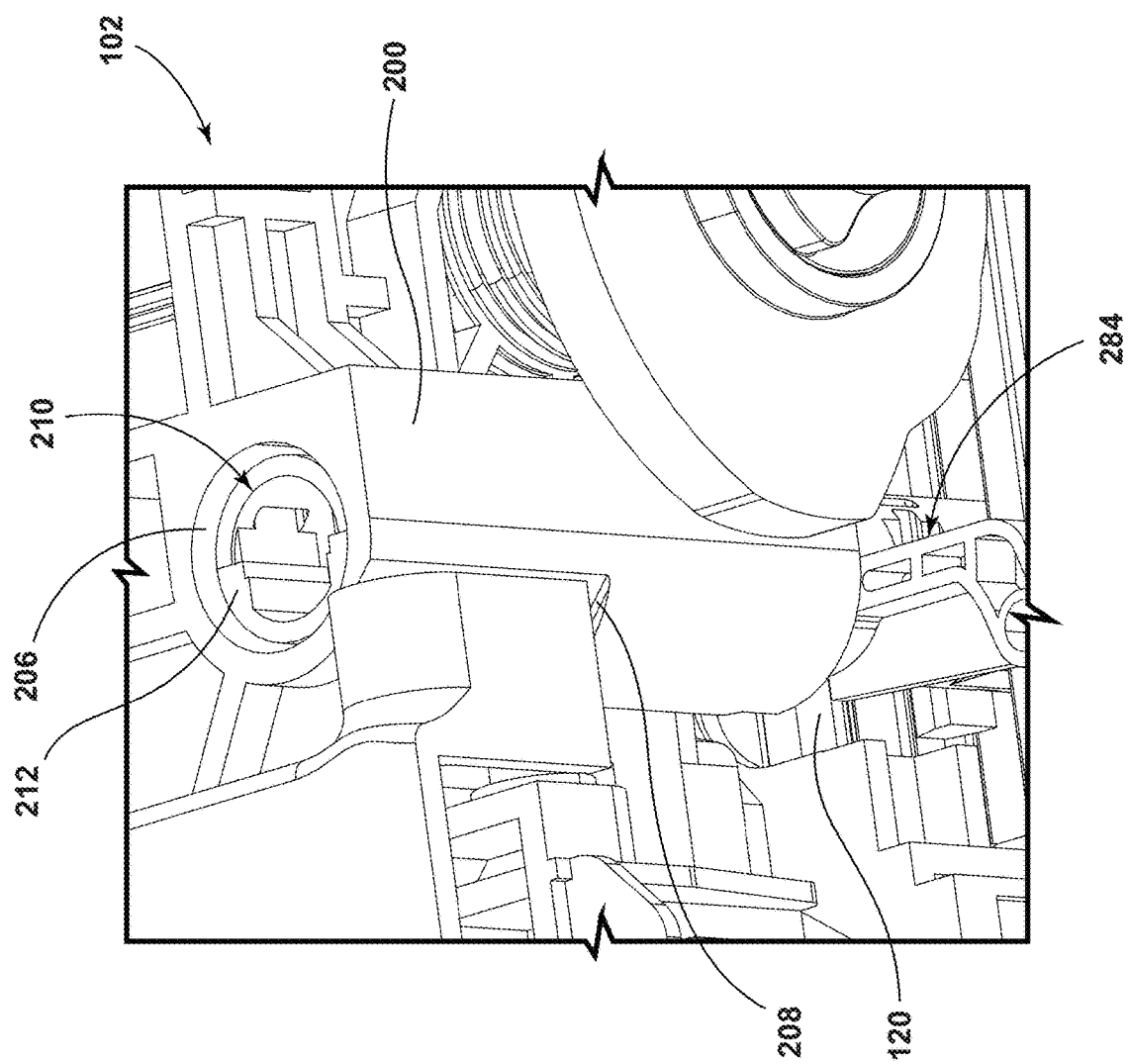
FIG. 6C is a perspective view generally illustrating the embodiment of the electrical connector of FIG. 6A connected to a support member.

In embodiments, such as generally illustrated in FIGS. 5, 6A, 6B, and/or 6C, an electrical connector 210 may include a first connector section 212 and/or a second connector section 214. A first connector section 212 may be connected to and extend from the support member 200, such as downward in a Z-direction. A second connector section 214 may be connected to the first connector section 212 and/or may extend obliquely or perpendicularly relative to the first connector section 212. The first connector section 212 and/or the second connector section 214 may, for example, include an electrically insulating material (e.g., a plastic). A first connector section 212 and/or a second connector section 214 may be configured to engage a track 120, such as via being inserted into a track receptacle 130 through a track opening 136. At least a portion of an electrical connector 210 (e.g., a first connector section 212) may engage and/or may be disposed in a recess 206 of a support member 200 (see, e.g., FIG. 6C). When engaged with a recess 206, an electrical connector 210 may be moveable (e.g., adjustable, slidable, etc.), at least to an extent, generally in a Z-direction to facilitate alignment of an electrical contact 220 and a conductor 150. Removal of an electrical connector 210 from a recess 206 (e.g., generally in a Z-direction) may be restricted and/or prevented by one or more portions of the electrical connector 210 (e.g., an adjustment portion 284) and/or by one or more portions of the support member 200, such as a protrusion, a flange, a stop, and/or a guide member/portion 208 for example.

With embodiments, such as generally illustrated in FIGS. 1 and/or 12-18B, an electrical connector 210 may be adjustable to a first position in which one or more electrical contacts 220 of the support assembly 102 are engaged within (e.g., in electrical contact with) a corresponding conductor 150 of the track assembly 104 (see, e.g., FIGS. 1, 14A-14C, 16A-16C, 17A, and 17B) and a second position in which the electrical contact(s) 220 is/are not engaged with the corresponding conductor 150 of the track assembly 104 (see, e.g., FIGS. 12, 15A-15C, 18A, and 18B). An electrical connector 210 may rotate to the first position and/or to the second position, such as about a connector rotational axis 216 (see, e.g., FIG. 13). The electrical connector 210 may, for example and without limitation, be rotated via an actuator of the support member 200, such as an electrical motor, a lever, and/or a slider 288. A slider 288 may slide in the X-direction relative to the support member 200 and the electrical connector 210, such as to engage/rotate the electrical connector 210.

In embodiments, a connector rotational axis 216 may extend substantially parallel to a Z-direction and/or may be a central longitudinal axis of the first connector section 212. When in the first position, the first connector section 212 may extend in a direction substantially parallel to a Z-direction, the second connector section 214 may extend in a direction substantially parallel to a Y-direction, and/or the electrical connector 210 may, at least to some degree, restrict removal of the support member 200 from the track assembly 104 generally in a Z-direction (e.g., the second connector section 214 may overlap with a portion of the track 120, such as the lip 132, in the Z-direction). When in the second position, the first connector section 212 may extend in a direction substantially parallel to a Z-direction, the second connector section 214 may extend in a direction substantially parallel to a X-direction, and/or the electrical connector 210 may not substantially restrict removal of the support member 200 from the track assembly 104.

With embodiments, such as generally illustrated in FIGS. 1, 5, 6A, 6B, and/or 12-18B, an electrical connector 210 may include one or more electrical contacts 220 configured to contact/engage a corresponding conductor 150 of a track 120. An electrical contact 220 may, for example, include one or more electrically conductive materials, such as aluminum, copper, and/or an alloy, among others. An electrical contact 220 may be electrically connected, at least indirectly (e.g., via wires/cables 204), to an electrical component 202 of the support member 200. When the support assembly 102 is disposed on the track assembly 104, adjustment (e.g., rotation) of an electrical connector 210 may adjust a position of the electrical contact 220 to (i) engage an electrical contact 220 and a corresponding conductor 150 to establish an electrical connection and/or (ii) disengage the electrical contact 220 and the corresponding conductor 150 to disconnect and/or break the electrical connection. An electrical contact 220 may maintain and/or remain in contact with a conductor 150 when a support member 200 is moved along a track 120, which may cause one or more portions of an electrical contact 220 configured to contact a conductor 150 (e.g., a third surface 244 and/or a sixth surface 250) to experience wear over time (e.g., approximately 0.5 mm of wear). As such, one or more portions of an electrical contact 220 may be configured to offset potential wear, such as by including extra material and/or being structured as a curved bulge (see, e.g., third surface 244 and/or sixth surface 250).

Figure 7:
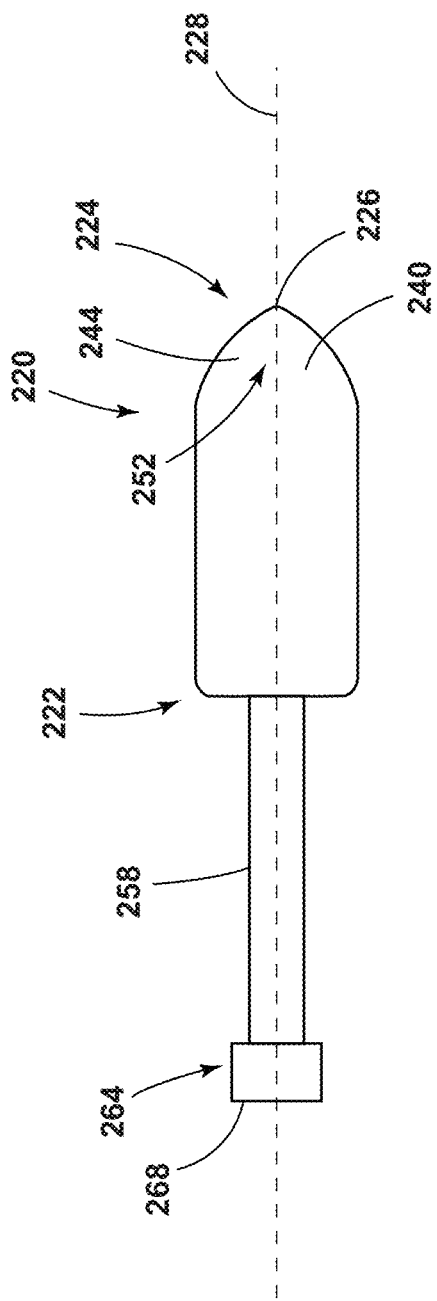
FIGS. 7 and 8 are top views generally illustrating embodiments of electrical contacts according to teachings of the present disclosure.

With embodiments, such as generally illustrated in FIGS. 5, 7, and/or 8, an electrical contact 220 may have a base end 222 and a distal end 224 disposed opposite the base end 222. The distal end 224 of an electrical contact 220 may be disposed at least partially outside of an electrical connector 210 and/or may project out of an electrical connector 210 (e.g., a first connector section 212 and/or a second connector section 214). A distal end 224 of the electrical contact 220 may be configured to engage, contact, and/or be received within a conductor 150. A distal end 224 of an electrical contact 220 may be curved/rounded and/or may be tapered to form a tip/point 226 (e.g., taper toward a contact rotational axis 228), which may facilitate insertion of the electrical contact 220 into a conductor 150 (see, e.g., FIG. 7). A distal end 224 of an electrical contact 220 may, additionally and/or alternatively, include one or more lateral and/or radial protrusions/wings 230A, 230B (see, e.g., FIG. 8). A base end 222 of an electrical contact 220 may be movably connected to an electrical connector 210 directly and/or indirectly. A base end 222 of an electrical contact 220 may be disposed at least partially within an electrical connector 210 (e.g., a first connector section 212 and/or a second connector section 214).

Figure 8:
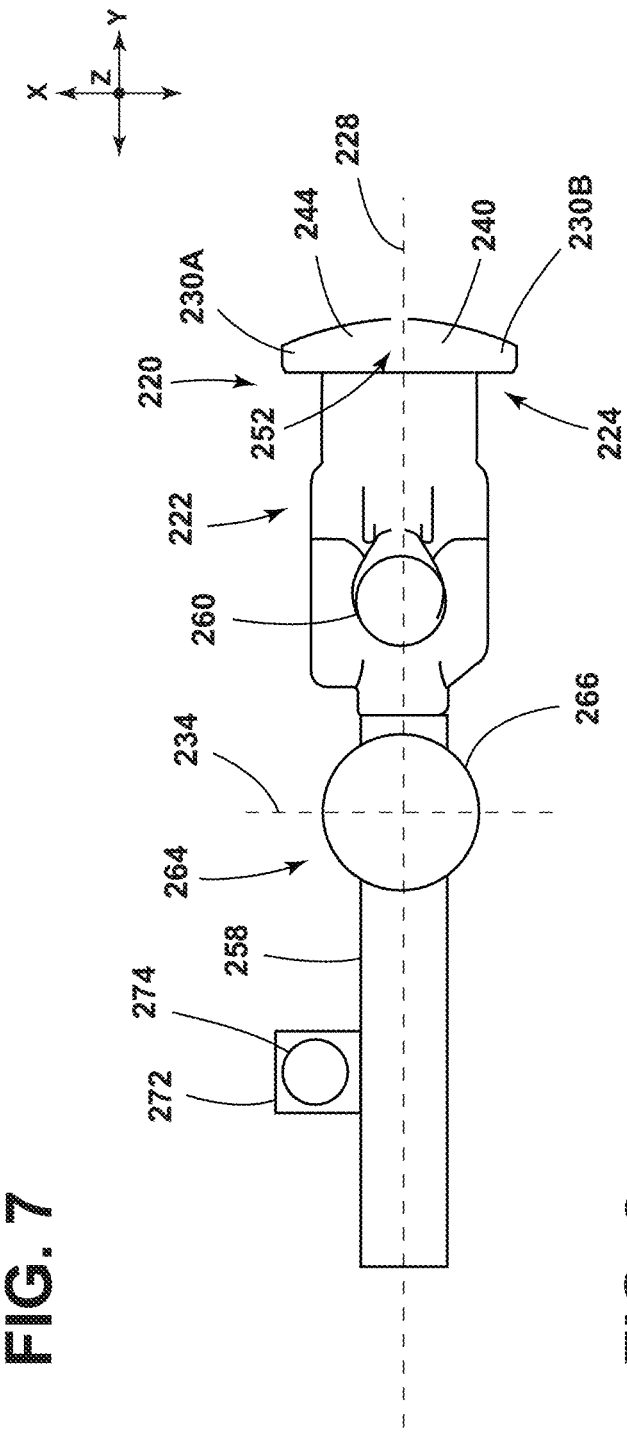

With embodiments, such as generally illustrated in FIGS. 1, 7, 8, and/or 12-16C, an electrical contact 220 may be adjustable, such as rotatable about a contact rotational axis 228. The contact rotational axis 228 may extend substantially parallel to the Y-direction when the electrical connector 210 is in the first position and substantially parallel to the X-direction when the electrical connector 210 is in the second position. The contact rotational axis 228 may extend obliquely or perpendicularly to the connector rotational axis 216.

With embodiments, such as generally illustrated in FIGS. 1, 6A, and/or 16A, an electrical contact 220 may move relative to the electrical connector 210 about the contact rotational axis 228 and/or may, with some configurations, not move/tilt to a substantially degree in a Z-direction relative to the electrical connector 210 (see, e.g., electrical contact 220B). Alternatively, a contact 220 may be configured to facilitate Z-direction alignment of itself and/or other electrical contacts 220 with a corresponding conductor 150 of the track 120 (see, e.g., electrical contacts 220A, 220C). For example and without limitation, an electrical contact 220A, 220C may be connected to the electrical connector 210 via a ball joint connection 232, which may permit the electrical contact 220 to (i) move parallel to and/or along the contact rotational axis 228 relative to the electrical connector 210 to compensate for Y-direction misalignment (e.g., approximately 1 mm), (ii) rotate about a Z-alignment rotational axis 234 relative to the electrical connector 210 to compensate for Z-direction misalignment (e.g., may move approximately 1 mm or less, such as approximately 0.6 mm, in a Z-direction), and/or (iii) rotate about the contact rotational axis 228 to engage a conductor 150 (e.g., rotate approximately 10° or less, such as approximately 8.5°, and/or move approximately 0.5 mm or less in the Z-direction). An electrical contact 220 may, additionally and/or alternatively, be adjustable (e.g., moveable, slidable, etc.) relative to a support member 200 and/or another electrical contact 220 generally in a Z-direction and/or a Y-direction. In examples, such as generally illustrated in FIG. 17B, each of the electrical contacts 220A, 220B, 220C may be adjustable independently of one another generally in a Z-direction and/or a Y-direction. Additionally and/or alternatively, Z-direction alignment of an electrical contact 220 may be facilitated via movement of an electrical connector 210 and/or a support member 200 generally in a Z-direction and/or a Y-direction. For example, an electrical connector 210 may be connected to the support member 200 (e.g., via a recess 206) such that the electrical connector 210 may move or float (e.g., approximately 3 mm or less, such as approximately 2.6 mm) relative to the support member 200 generally in a Z-direction. In some embodiments, such as those where an electrical contact 220 is connected to the electrical connector 210 via a ball joint connection 232, the electrical connector 210 may be substantially fixed relative to the support member 200 in a Z-direction (e.g., the electrical contacts 220 may be configured to sufficiently compensate Z-direction misalignment).

With embodiments, such as generally illustrated in at least one of FIGS. 9A-11, an electrical contact 220 may include a plurality of external surfaces, such as a first surface 240, a second surface 242, a third surface 244, a fourth surface 246, a fifth surface 248, and/or a sixth surface 250. A first surface 240 may be substantially flat (e.g., a first flat surface) and/or may extend between and connect a second surface 242 and a sixth surface 250. A second surface 242 (e.g., a first transition surface) may extend between and connect a first surface 240 and a third surface 244 and/or may define a transition 252 therebetween. A second surface 242 may extend substantially radially relative to the contact rotational axis 228 such that the transition 252 is a stepped transition. A third surface 244 may be curved (e.g., a first curved surface) and/or may extend between and connect a second surface 242 and a fourth surface 246. At least a portion of the third surface 244 (e.g., a portion in a region of the transition 252) may be disposed radially further from the contact rotational axis 228 than the first surface 240. A fourth surface 246 (e.g., a second flat surface) may be substantially flat and/or may extend between and connect a third surface 244 and a fifth surface 248. A fifth surface 248 (e.g., a second transition surface) may extend between and connect a fourth surface 246 and a sixth surface 250 and/or may define a second transition 254 therebetween. A fifth surface 248 may extend substantially radially relative to the contact rotational axis 228 such that the second transition 254 is a second stepped transition. A sixth surface 250 may be curved (e.g., a second curved surface) and/or may extend between and connect a fifth surface 248 and a first surface 240. At least a portion of the sixth surface 250 (e.g., a portion in a region of the second transition 254) may be disposed radially further from the contact rotational axis 228 than the fourth surface 246.

Figure 11:
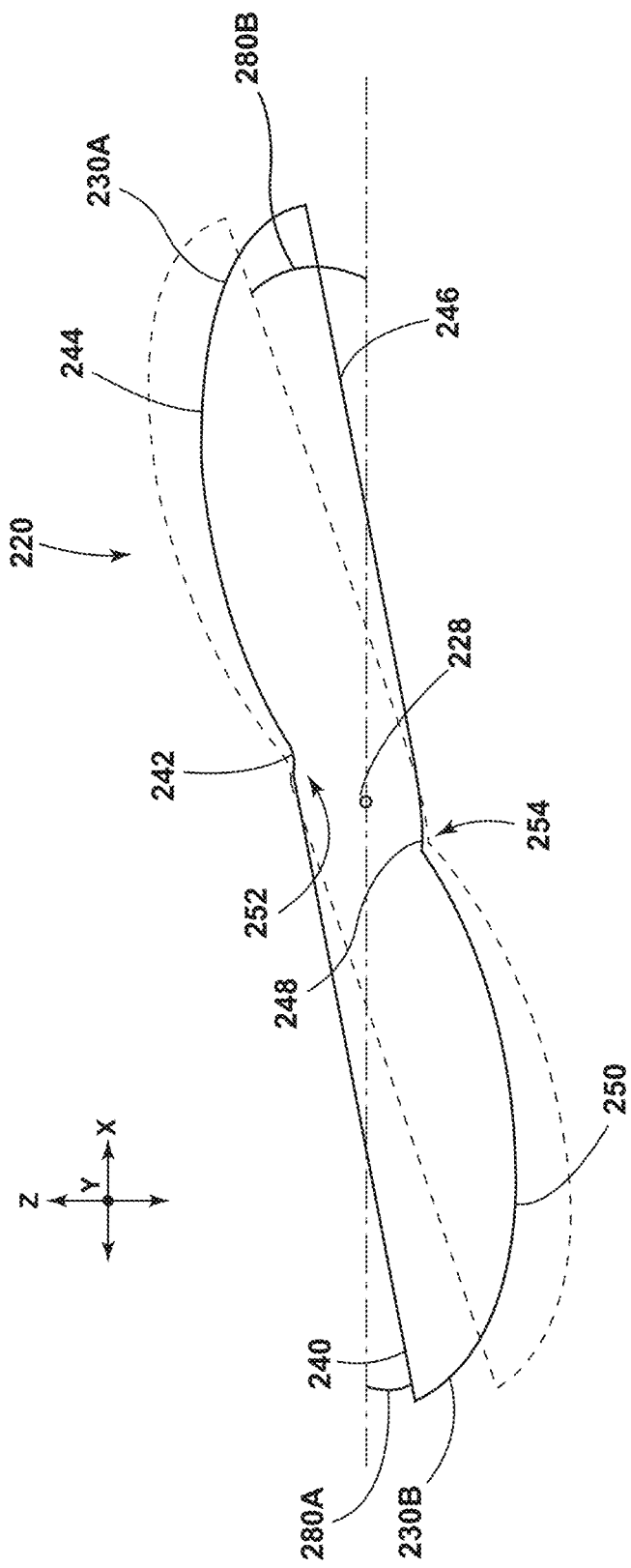
FIG. 11 generally illustrate an orientation of an embodiment of an electrical contact in a first rotational position and a second rotational position according to teachings of the present disclosure.
Figure 12:
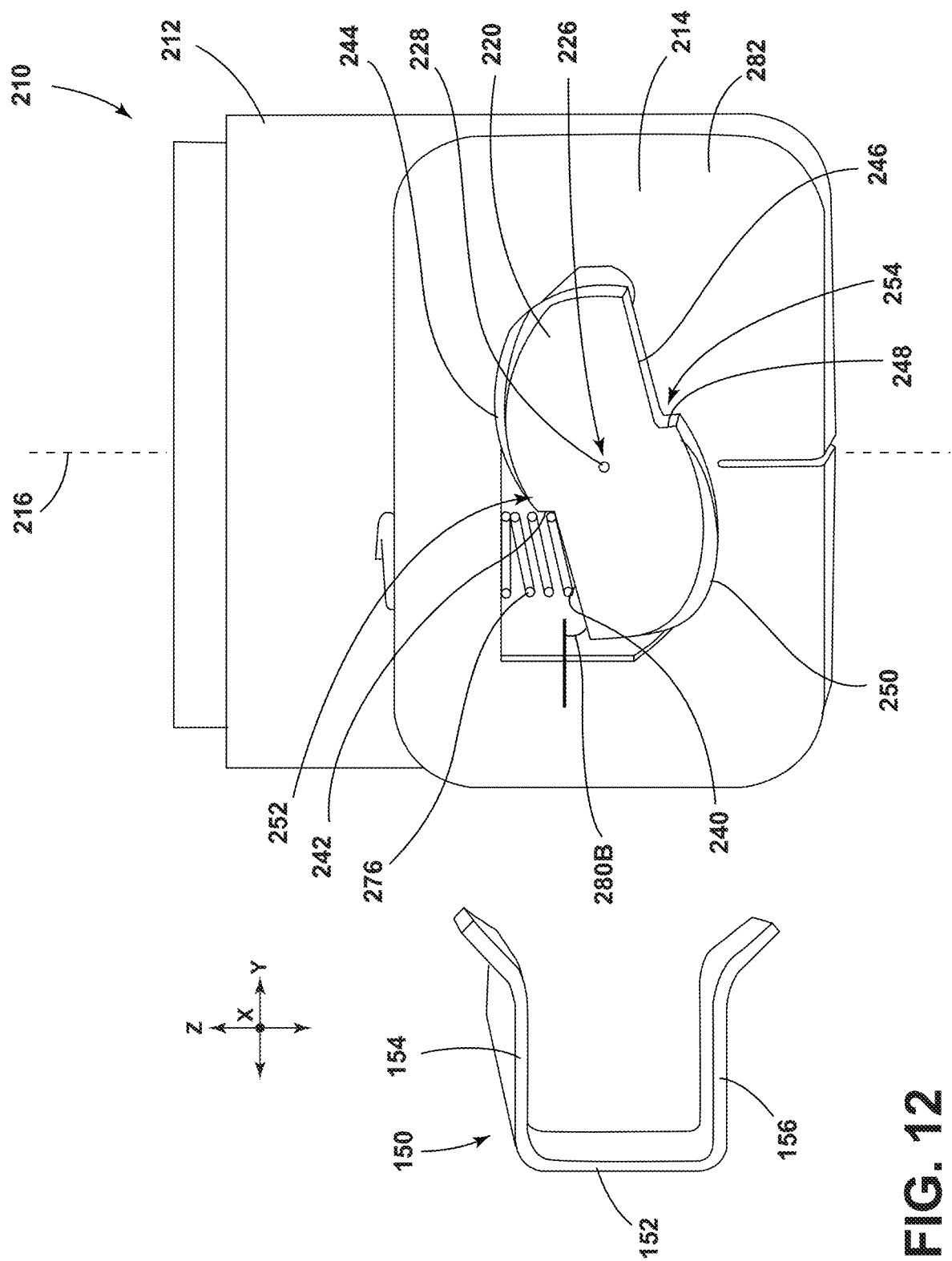
FIG. 12 is a view generally illustrating an embodiment of an electrical connector and a conductor when the electrical connector is in a second position according to teachings of the present disclosure.

With embodiments, such as generally illustrated in at least one of FIGS. 9A-11, a first surface 240, a second surface 242, and/or a third surface 244 may be disposed opposite a fourth surface 246, a fifth surface 248, and/or a sixth surface 250. A first surface 240 and a fourth surface 246 may extend substantially parallel to the contact rotational axis 228 and/or to one another. In examples, a first surface 240 and a third surface 244 may be connected directly to one another and/or a fourth surface 246 and a sixth surface 250 may be connected directly to one another such that an electrical contact 220 does not include a second surface 242, a stepped transition 252, a fifth surface 248, and/or a second stepped transition 254 (see, e.g., FIG. 18A). Examples of potential orientations of an electrical contact 220 when an electrical connector 210 is in the first position are generally illustrated in FIGS. 9A and 10A. Examples of potential orientations of an electrical contact 220 when an electrical connector 210 is in the second position are generally depicted in FIGS. 9B and 10B. A potential orientation of an electrical contact 220 when an electrical connector 210 is in the first position (solid line profile) and when an electrical connector 210 is in the second position (dashed line profile) are shown in FIG. 11. As generally depicted in FIGS. 17A-18B, an electrical contact 220 may, for example, have one or more external surfaces forming an elongated profile with rounded ends, an oval-shaped profile, and/or any other desired shape.

With embodiments, such as generally illustrated in FIGS. 1, 6A, 6B, 15A-16C, and/or 17B, an electrical connector 210 may include a plurality of electrical contacts 220, such as a first electrical contact 220A, a second electrical contact 220B, and/or a third electrical contact 220C. One or more of the electrical contacts 220A, 220B, 220C may be configured the same as and/or differently from at least one other electrical contact 220A, 220B, 220C. A first electrical contact 220A, a second electrical contact 220B, and a third electrical contact 220C may be disposed in a stacked configuration such that the electrical contacts 220A, 220B, 220C are substantially aligned when viewed from a Z-direction. A first electrical contact 220A, a second electrical contact 220B, and a third electrical contact 220C may each be rotatable about a respective contact rotational axis 228A, 228B, 228C, such as via respective biasing members 276A, 276B, 276C.

In embodiments, such as generally illustrated in FIGS. 1, 5, 6A, 7 and/or 8, an electrical contact 220 may include a stabilizer portion 258. A stabilizer portion 258 include an elongated member, for example, and/or may be configured to facilitate connection of an electrical contact 220 to the electrical connector 210 and/or to stabilize, at least to some degree, an electrical contact 220. A stabilizer portion 258 may be movably connected to an electrical connector 210 and/or may be disposed at least partially within an electrical connector 210 (e.g., a first connector section 212 and/or a second connector section 214). A stabilizer portion 258 may be connected to and extend from a base end 222 of the electrical contact 220 (e.g., along the contact rotational axis 228) and/or may movably connect an electrical contact 220 to an electrical connector 210. A stabilizer portion 258 may be configured to move (e.g., along the contact rotational axis 228) and/or rotate (e.g., about the contact rotational axis 228 and/or the Z-alignment rotational axis 234) in conjunction with the electrical contact 220.

In embodiments, such as generally illustrated in FIGS. 1, 8, and/or 17B, an electrical contact 220 and/or a stabilizer portion 258 may include an aperture 260 through which one or more wires/cables 204 may pass through/into. A first wire 204A may be connected (e.g., electrically) to a first electrical contact 220A and/or may extend into a first aperture 260A of the first electrical contact 220A. A second wire 204B may be connected to a second electrical contact 220B, may pass through the first aperture 260A of the first electrical contact 220A (e.g., disposed above the second electrical contact 220B), and/or may extend into a second aperture 260B of the second electrical contact 220B. A third wire 204C may be connected to a third electrical contact 220C (e.g., disposed below the first and second electrical contacts 220A, 220B), may extend through the first aperture 260A in the first electrical contact 220A, may extend through the second aperture 260B in the second electrical contact 220B, and/or may extend into a third aperture 260C of the third electrical contact 220C. In examples, a first aperture 260A of a first electrical contact 220A, a second aperture 260B of a second electrical contact 220B, and a third aperture 260C of a third electrical contact 220C may be substantially aligned with one another when viewed from a Z-direction.

In embodiments, such as generally illustrated in FIGS. 1, 5, 6A, 7, 8, and/or 16A, an electrical contact 220 may include a connection portion 264. A connection portion 264 may be connected to and/or an integral part of the stabilizer portion 258. An electrical contact 220 and/or a stabilizer portion 258 may be connected to an electrical connector 210 via a connection portion 264.

With embodiments, such as generally illustrated in FIGS. 1, 6A, 8, and 16A, a connection portion 264 may include a ball joint portion 266, which may connect an electrical contact 220 to an electrical connector 210 via a ball joint connection 232. A ball joint portion 266 and/or a ball joint connection 232 may permit an electrical contact 220 to (i) move parallel to and/or along the contact rotational axis 228 relative to the electrical connector 210 to compensate for Y-direction misalignment, (ii) rotate about a Z-alignment rotational axis 234 relative to the electrical connector 210 to compensate for Z-direction misalignment, and/or (iii) rotate about the contact rotational axis 228 to engage a conductor 150. A Z-alignment rotational axis 234 may extend (i) through a ball joint portion 266, (ii) substantially perpendicular to the contact rotational axis 228, (iii) substantially parallel to a X-direction when the electrical connector 210 is in the first position and/or (iv) substantially parallel to a Y-direction when the electrical connector 210 is in the second position.

With embodiments, such as generally illustrated in FIGS. 1, 5, 6A, 7, and 16A, a connection portion 264 may include a mount portion 268, which may restrict and/or substantially prevent rotation of an electrical contact 220 in a Z-direction (e.g., about a Z-alignment rotational axis 234) relative to an electrical connector 210. A mount portion 268 may, additionally and/or alternatively, permit movement of an electrical contact 220 parallel to and/or along the contact rotational axis 228 relative to an electrical connector 210.

In embodiments, such as generally illustrated in FIGS. 8, 10A, 10B, and 16A, an electrical contact 220 may include a support protrusion 272 configured to support and/or connect with a biasing member 276. A support protrusion 272 may be connected to and/or an integral part of an electrical contact 220 and/or a stabilizer portion 258. A support protrusion 272 may extend away from a stabilizer portion 258 (e.g., radially away from a contact rotational axis 228) and/or may extend obliquely or perpendicularly relative to a stabilizer portion 258 (e.g., the stabilizer portion 258 may extend in a Y-direction and the support protrusion 272 may extend in an X-direction when the electrical connector 210 is in the first position).

In embodiments, such as generally illustrated in FIGS. 8, 10A, 10B, and 16A, an electrical contact 220 may include an engagement protrusion 274 configured to engage a biasing member 276 and/or to restrict movement of a biasing member 276 relative to an electrical contact 220 (e.g., a support protrusion 272). An engagement protrusion 274, for example, may be configured to be received at least partially within a biasing member 276 (e.g., a helical spring). An engagement protrusion 274 may be connected to and/or an integral part of an electrical contact 220, a stabilizer portion 258, and/or a support protrusion 272. An engagement protrusion 274 may be disposed on and/or project from a support protrusion 272. An engagement protrusion 274 may extend obliquely or perpendicularly relative to a support protrusion 272 and/or a stabilizer portion 258 (e.g., the stabilizer portion 258 may extending in a Y-direction, the support protrusion 272 may extend in an X-direction, and the engagement protrusion 274 may extend in a Z-direction when the electrical connector 210 is in the first position).

With embodiments, such as generally illustrated in FIGS. 1, 5, 6A, 9A-10B, 12-14C, and/or 16A, an electrical connector 210 may include a biasing member 276 (e.g., a spring) configured to bias an electrical contact 220 into engagement and/or abutment with a conductor 150, such as to maintain an electrical connection between an electrical contact 220 and a corresponding conductor 150 of a track 120. A biasing member 276 may be disposed at least partially within an electrical connector 210 and/or may extend substantially parallel to a Z-direction and/or a connector rotational axis 216. A biasing member 276 may be configured to apply a force to an electrical contact 220, such as in a direction substantially parallel to the Z-direction. A biasing member 276 may be disposed offset from a contact rotational axis 228, at least in the X-direction for example, which may bias an electrical contact 220 about the contact rotational axis 228. For example, a biasing member 276 may bias an electrical contact 220 about a contact rotational axis 228 in a first rotational direction (e.g., counterclockwise in FIGS. 9A-12, and 16A) or in a second rotational direction (e.g., clockwise with respect to the electrical contact 220 in FIG. 18A).

With embodiments, such as generally illustrated in FIGS. 1, 5, 6A, 9A-10B, 12-14C, and/or 16A, a biasing member 276 may be disposed on and supported by an electrical contact 220. A biasing member 276 may be disposed directly on a surface of the electrical contact 220 (e.g., a first surface 240; see, e.g., FIGS. 9A, 9B). Additionally and/or alternatively, a biasing member 276 may be disposed on a support protrusion 272 of an electrical contact 220 (see, e.g., FIGS. 10A, 10B, and/or 16A). A biasing member 276 may be configured to engage and/or receive an engagement protrusion 274 of an electrical contact 220 to, for example, facilitate a connection between the biasing member 276 and the electrical contact 220. Engagement between the biasing member 276 and the engagement protrusion 274 may restrict, at least to some extent, movement of the biasing member 276 relative to the support protrusion 272. For example and without limitation, an engagement protrusion 274 may restrict/prevent the biasing member 276 from sliding off of the support protrusion 272 during rotation of the electrical contact 220 about the contact rotational axis 228 (see, e.g., FIGS. 10A, 10B). A biasing member 276 may disposed on and/or connected to a biasing member support 278 of an electrical connector 210 (see, e.g., FIGS. 9A-10B), which may support an end of the biasing member 276 opposite the electrical contact 220 (e.g., a biasing member 276 may be disposed substantially between an electrical contact 220 and a biasing member support 278). A biasing member support 278 may be configured similar to a support protrusion 272 and/or an engagement protrusion 274, and may be fixed relative to the electrical connector 210.

With embodiments, such as generally illustrated in FIGS. 1, 14A-14C, 16A-16C, 17A, and/or 17B, when an electrical connector 210 is in the first position, a biasing member 276 may bias an electrical contact 220 into engagement and/or physical contact with a conductor 150, such as to facilitate an electrical connection therebetween. The biasing member 276 may bias a first portion of an electrical contact 220 (e.g., a third surface 244, 244A, 244B, 244C) into abutment with a portion of a conductor 150 (e.g., an inner surface of a conductor top portion 154, 154A, 154B, 154C) and bias a second portion of the electrical contact 220 (e.g., a sixth surface 250, 250A, 250B, 250C) into physical contact with another portion of the conductor 150 (e.g., an inner surface of a conductor bottom portion 156, 156A, 156B, 156C; see, e.g., FIGS. 14B and 16A). With such a configuration, for example, a contact 220 may be electrically connected with the same conductor 150 in two different locations.

Figure 13:
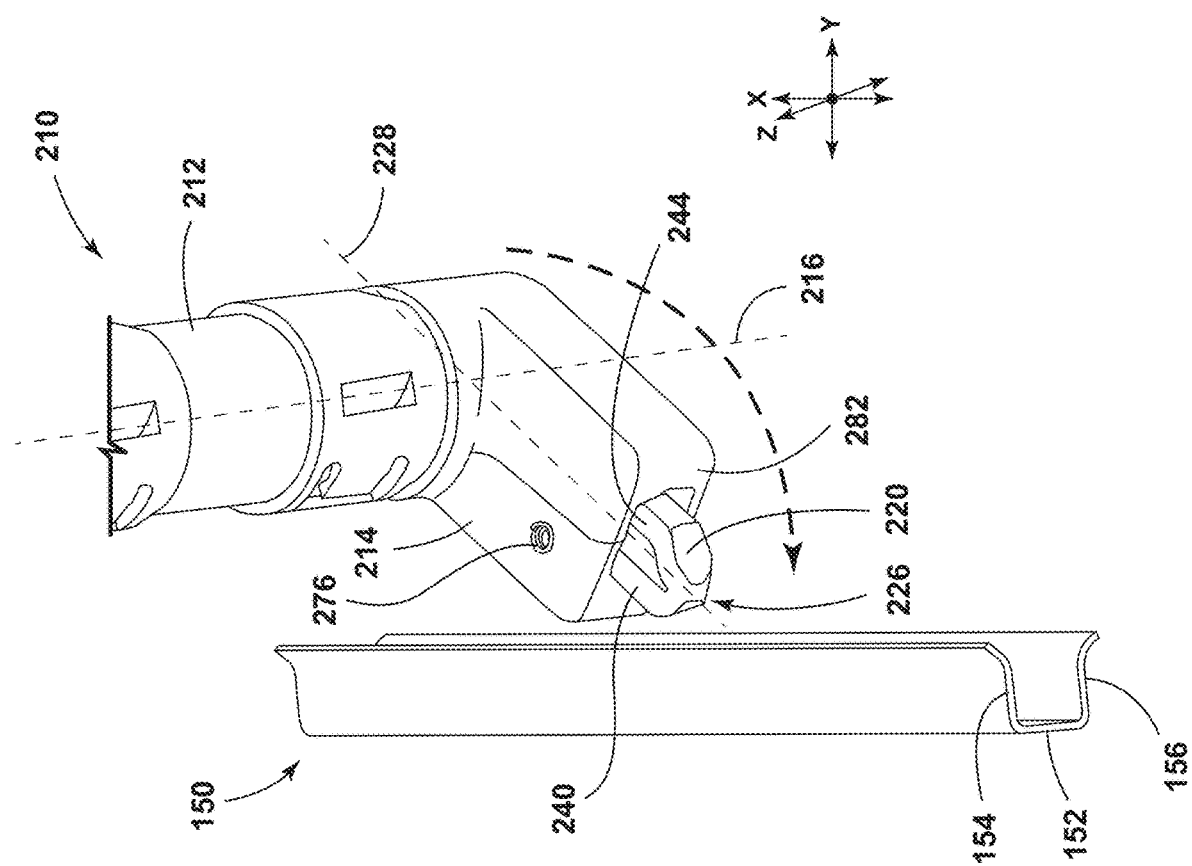
FIG. 13 is a view generally illustrating the electrical connector and the conductor of FIG. 12 when the electrical connector is rotating from a second position toward a first position according to teachings of the present disclosure.
Figure 14A:
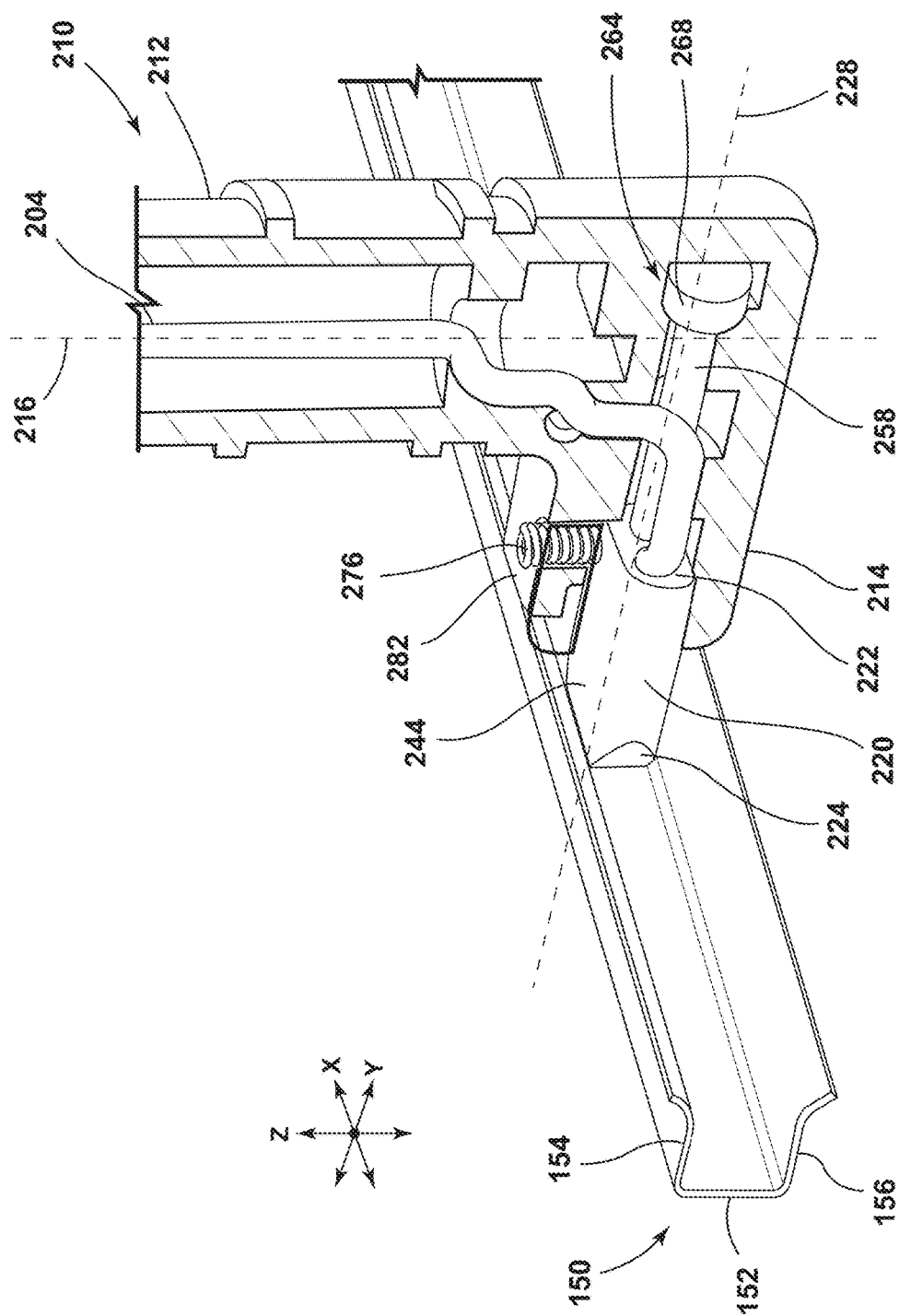
FIGS. 14A-14C are views generally illustrating the electrical connector and the conductor of FIG. 12 when the electrical connector is in a first position according to teachings of the present disclosure.
Figure 14B:
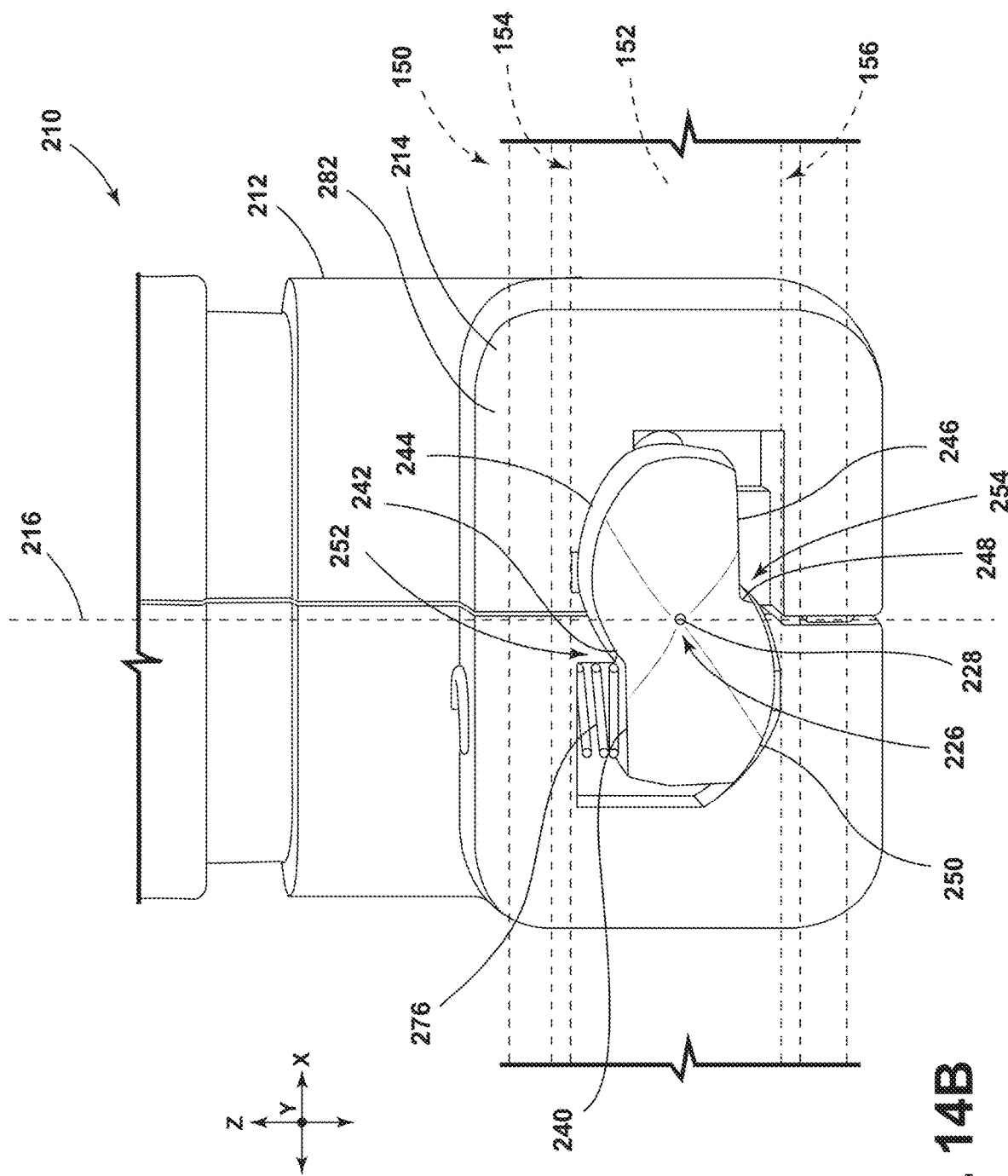
Figure 14C:
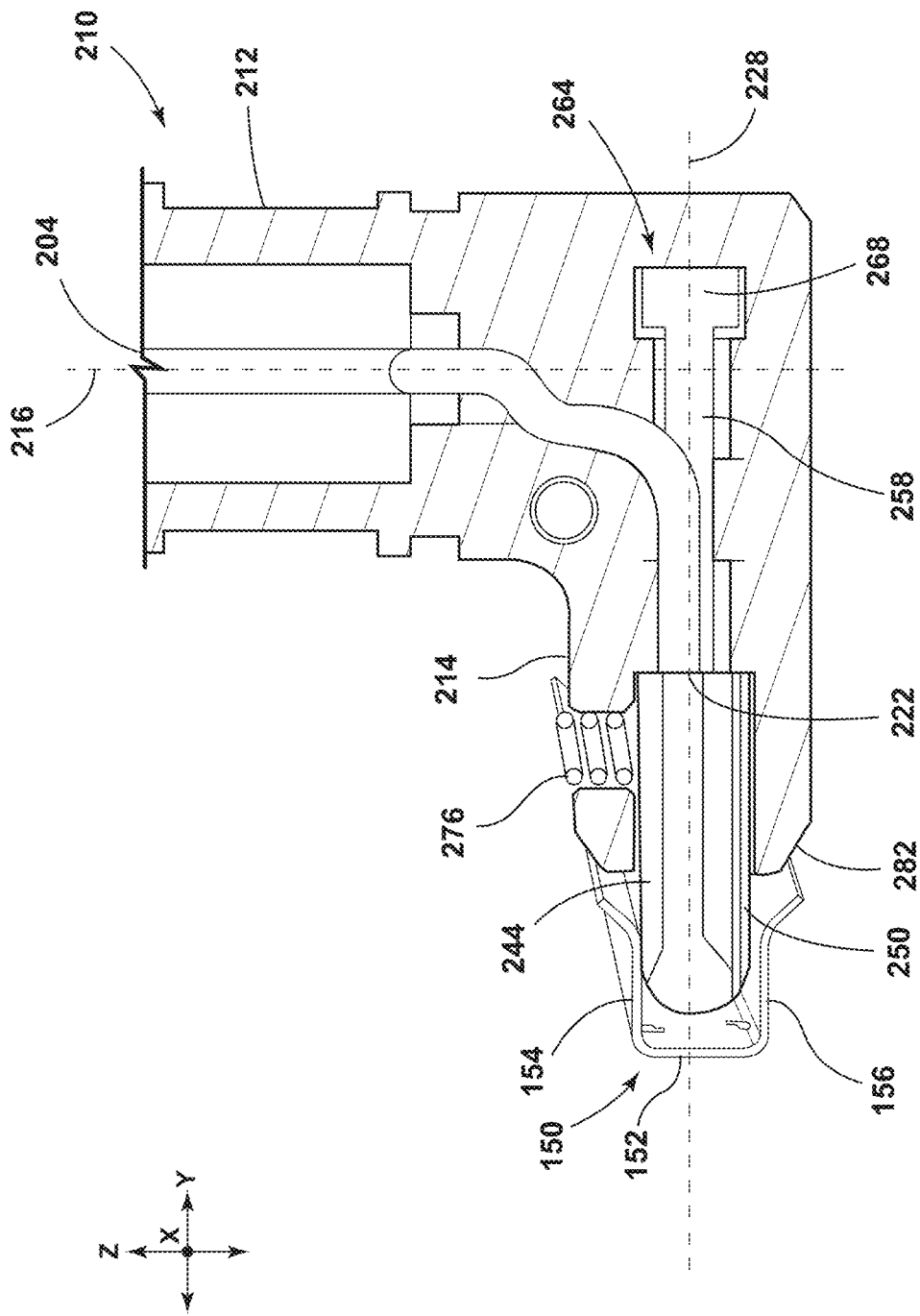
Figure 15A:
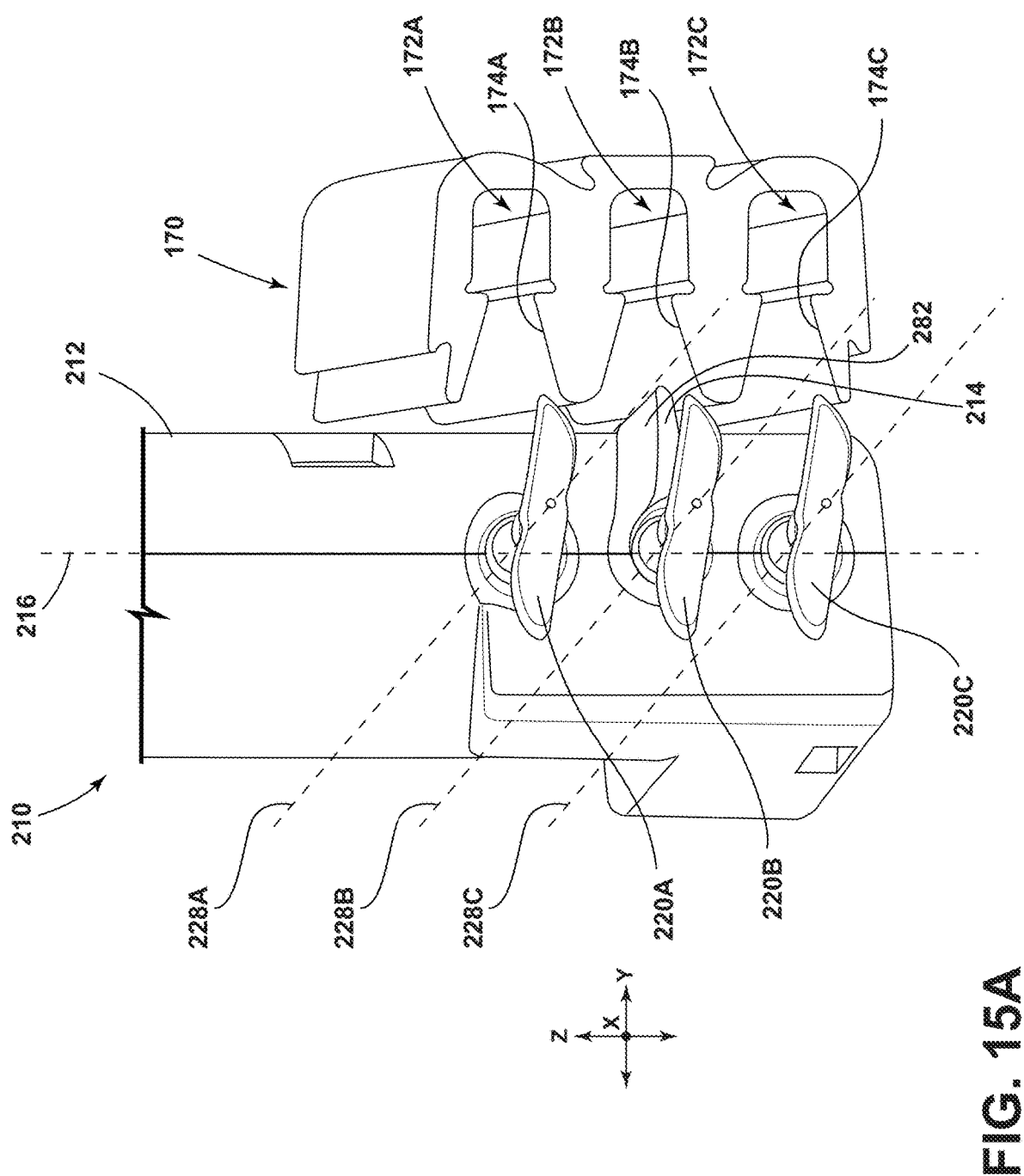
FIG. 15A is a view generally illustrating an embodiment of an electrical connector and electrical contacts when the electrical connector is between a first position and a second position.
Figure 15B:
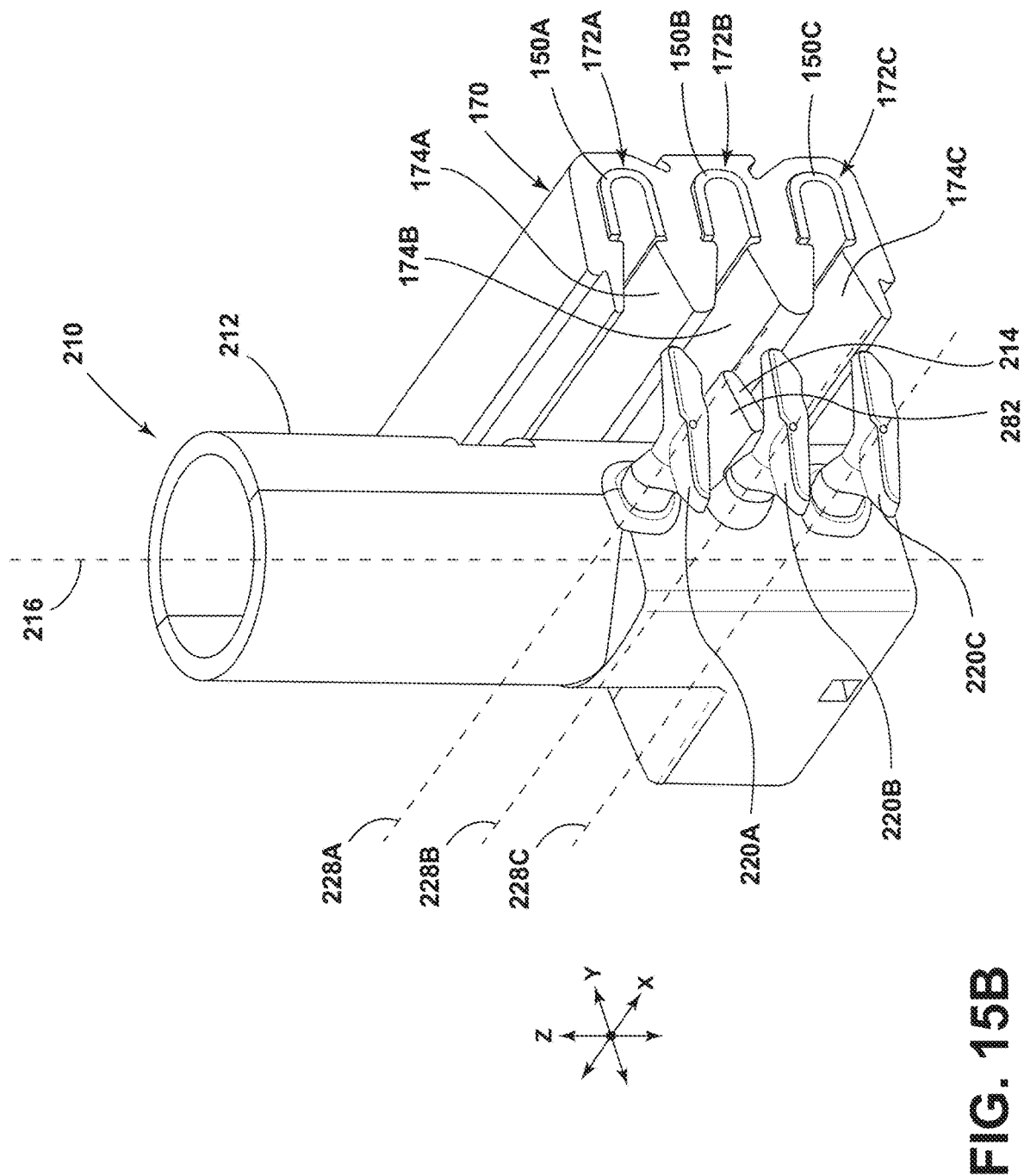
FIGS. 15B and 15C are views generally illustrating an embodiment of an electrical connector and electrical contacts when the electrical connector is in a second position according to teachings of the present disclosure.
Figure 15C:
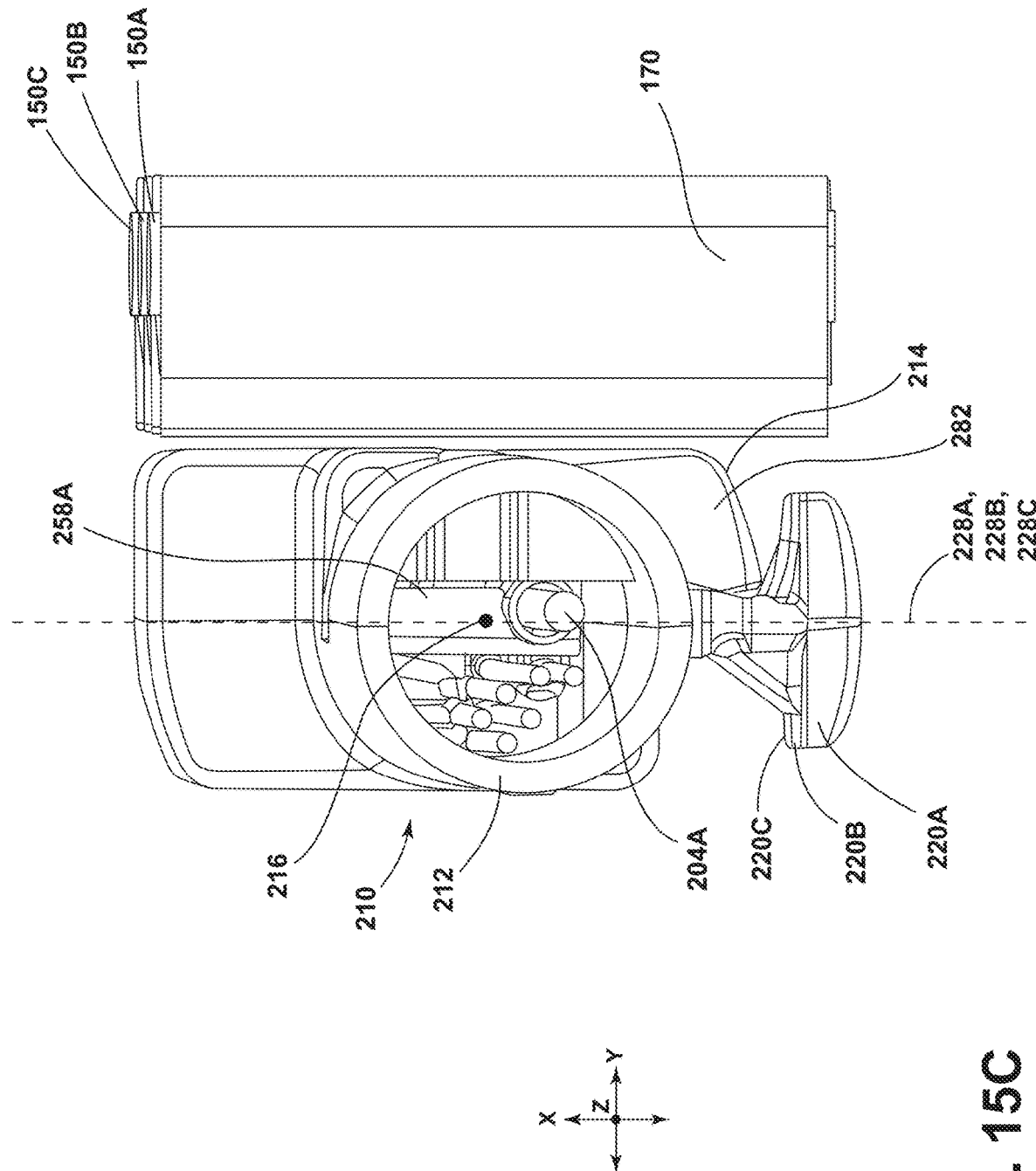
Figure 16A:
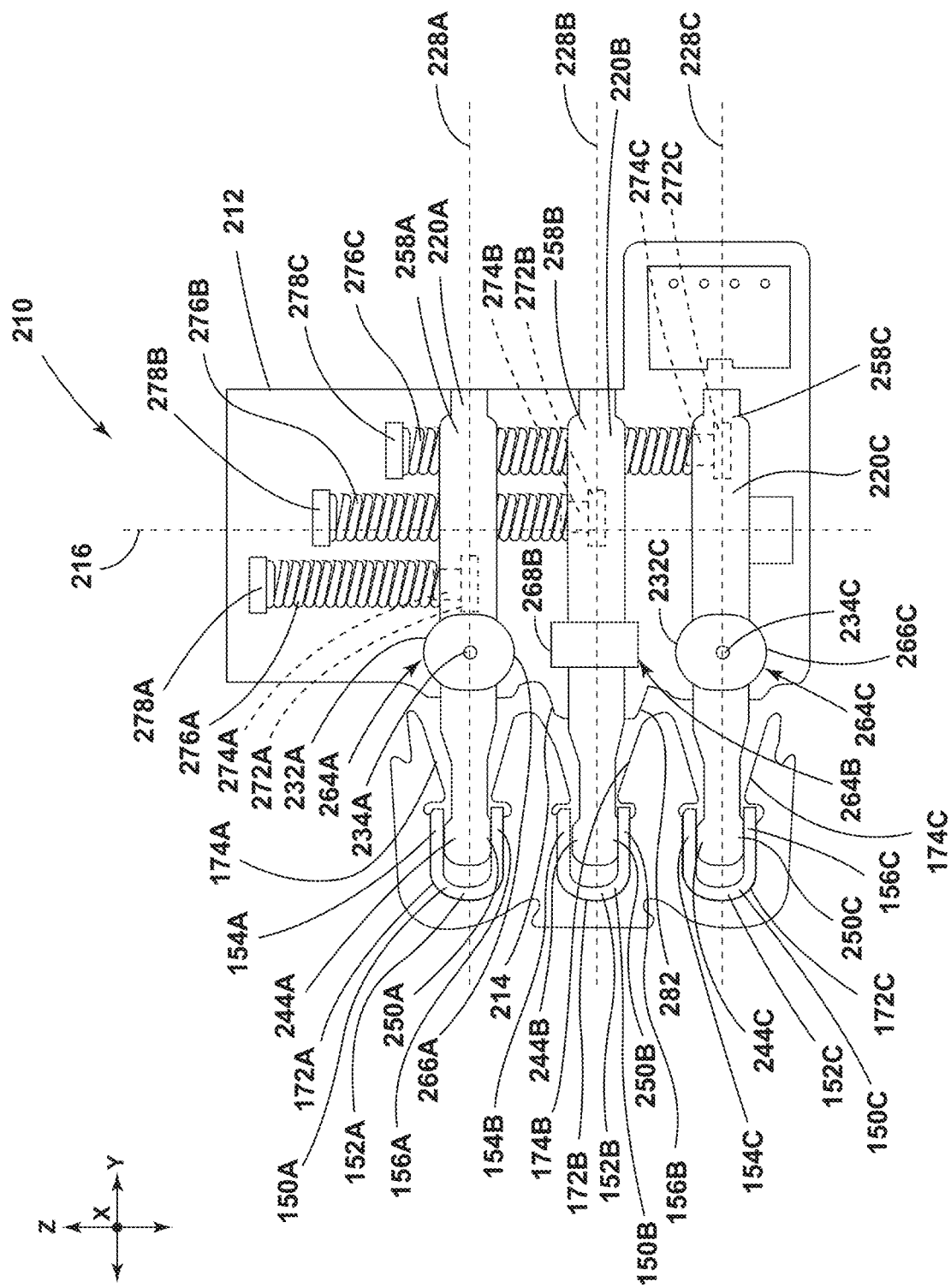
FIGS. 16A-16C are views generally illustrating embodiments of an electrical connector and electrical contracts when the electrical connector is in a first position according to teachings of the present disclosure.
Figure 16B:
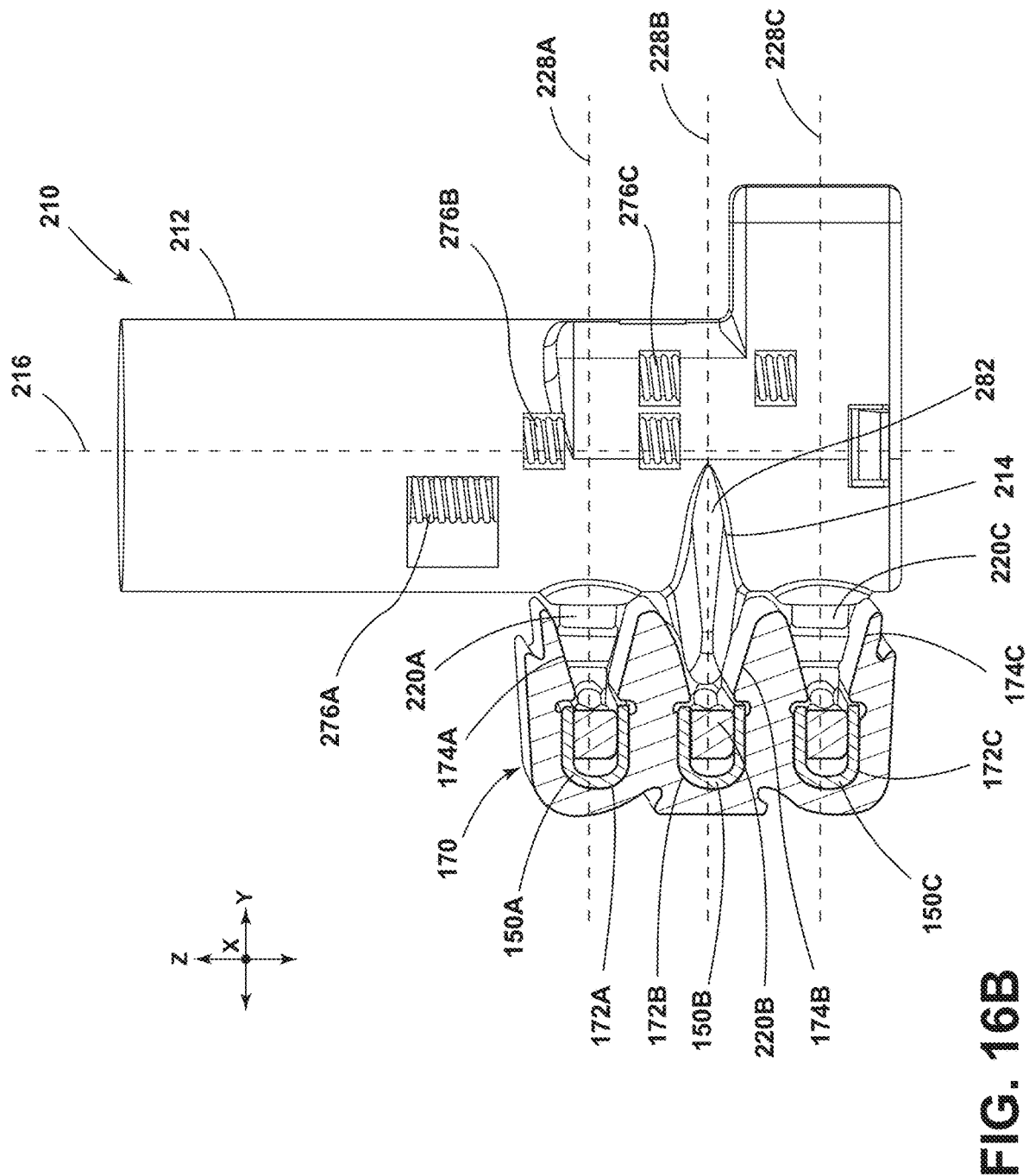
Figure 16C:
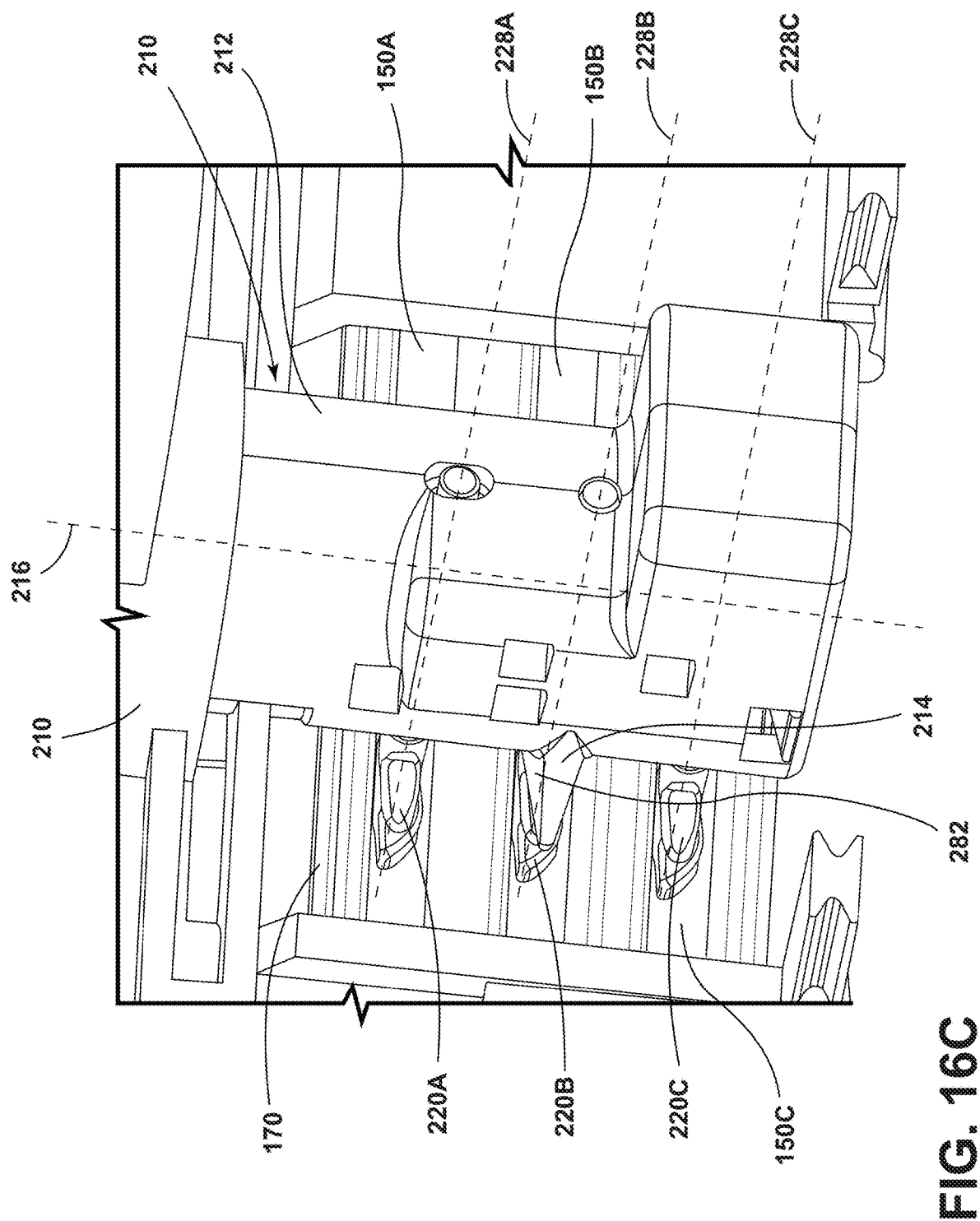

In embodiments, when the electrical connector 210 is in the first position, a portion and/or a surface of an electrical contact 220 (e.g., a first surface 240; see, e.g., FIGS. 9A, 11, and 14B) and/or a surface of a support protrusion 272 (see, e.g., FIGS. 10A and 16A) may be disposed at an angle 280A relative to an X-Y plane (e.g., a horizontal plane). During insertion of an electrical contact 220 into a conductor 150 (e.g., via rotation of an electrical connector 210 as shown in FIG. 13), engagement between the electrical contact 220 and the conductor 150 may cause the electrical contact 220 to rotate, at least to some degree, against the force of the biasing member 276. When an electrical connector 210 is in a second position, a surface of an electrical contact 220 (e.g., a first surface 240; see, e.g., FIGS. 9B, 11, and 12) and/or a surface of a support protrusion 272 (see, e.g., FIG. 10B) may be disposed at an angle 280B (e.g., 15°), which may be larger than the angle 280A, relative to an X-Y plane (e.g., a horizontal plane). When an electrical connector 210 is in a second position, a portion and/or a surface of a biasing member 276 may be disposed spaced apart from a surface of an electrical contact 220 (e.g., a first surface 240) and/or a surface of a support protrusion 272, which may allow rotational movement of the electrical contact 220 about the contact rotational axis 228, at least to some extent. In examples, when the electrical connector 210 is in a first position, a surface of the biasing member 276 may be disposed substantially flush with a surface of an electrical contact 220 (e.g., a first surface 240) and/or a surface of a support protrusion 272 (see, e.g., FIG. 14B). Additionally and/or alternatively, when an electrical connector 210 is in a first and/or a second position, a portion and/or a surface of a biasing member 276 may contact and/or abut a surface of an electrical contact 220 (e.g., a first surface 240) and/or a surface of a support protrusion 272 such that an angle, which may be the same as or different from an angle 280A, 280B, is defined therebetween.

In embodiments, such as generally illustrated in FIGS. 1, 5-6B, and/or 12-16C, an electrical connector 210 may include an alignment protrusion 282 that may be configured to facilitate alignment of the electrical connector 210 and/or electrical contacts 220 with the track 120 and/or conductors 150. An alignment protrusion 282 may be disposed on and/or connected to an electrical connector 210, and/or may extend from the electrical connector 210 (e.g., obliquely, substantially perpendicularly, etc.). In examples, a second connector section 214 of an electrical connector 210 may be configured as an alignment protrusion 282 and/or an alignment protrusion 282 may define a second connector section 214 of an electrical connector 210. An alignment protrusion 282 may be configured to engage an insulator 170 and/or be at least partially received in an insulator 170 (e.g., in a tapered opening 174 of a recess 172). For example and without limitation, as the electrical connector 210 rotates toward the first position, the alignment protrusion 282 may engage and/or interact with the track 120 (e.g., a tapered opening 174), which may move the electrical connector 210 generally upward in a Z-direction relative to the track 120 and/or the support member 200, rotate one or more electrical contacts 220 about a respective Z-alignment rotational axis 234 (e.g., via ball joint connections 232), and/or align one or more electrical contacts 220 with a corresponding conductor 150 in a Z-direction.

In embodiments, such as generally illustrated in FIGS. 6B, 15A-15C, 16B, and/or 16C, an alignment protrusion 282 may include one or more of a variety of shapes, sizes, and/or configurations. For example and without limitation, the alignment protrusion 282 may include a fin configuration that may extend in substantially the same direction as the electrical contacts 220 and/or that may have a height (e.g., in the Z-direction) that tapers/decreases in a radially outward direction and/or in a circumferential direction relative to the connector rotational axis 216. The height of an alignment protrusion 282 may taper in a circumferential direction around the connector rotational axis 216 such that the height is smallest proximate a portion of the alignment protrusion 282 that engages the track 120 and/or the insulator 170 first and increases such that further engagement of the alignment protrusion 282 with the track 120 and/or the insulator 170 may move the electrical connector 210 in a Z-direction, which may move an electrical contact 220 into Z-direction alignment with a corresponding conductor 150.

With embodiments, such as generally illustrated in FIGS. 1, 5, 6A, and/or 15A-16C, a first, a second, and/or a third electrical contact 220A, 220B, 220C may include a respective stabilizer portion 258A 258B, 258C, a respective connection portion 264A, 264B, 264C, a respective support protrusion 272A, 272B, 272C, and/or a respective engagement protrusion 274A, 274B, 274C. The support protrusions 272A, 272B, 272C of the electrical contacts 220A, 220B, 220C may be disposed offset from one another in a direction parallel to the contact rotational axes 228A, 228B, 228C, which may allow a plurality of biasing members 276A, 276B, 276C to be arranged adjacent to one another and extend substantially parallel to one another in a Z-direction. The biasing members 276A, 276B, 276C may each be associated with a corresponding electrical contact 220A, 220B, 220C and contact a corresponding biasing member support 278A, 278B, 278C.

With embodiments, an electrical connector 210 may include an alignment protrusion 282 disposed adjacent to the second electrical contact 220B, which may be disposed between electrical contacts 220A, 220C. The alignment protrusion 282 may facilitate Z-direction alignment of at least the second electrical contact 220B and the second conductor 150B, such as by adjusting the electrical connector 210 (e.g., within a recess 206) generally in a Z-direction and/or a Y-direction relative to a support member 200 and/or a track 120. The first and/or third electrical contact 220A, 220C may include a respective ball joint portion 266A, 266C and/or may be connected to the electrical connector 210 via a respective ball joint connection 232A, 232C. In some circumstances (e.g., as a result of manufacturing differences/tolerances), after the alignment protrusion 282 aligns the second contact 220B and the second conductor 150B in a Z-direction, electrical contacts 220A, 220C may not be directly aligned with first and third conductors 150A, 150C in the Z-direction (e.g., if they remain parallel with a Y-direction). In such circumstances, electrical contacts 220A, 220C may rotate about axes 234A, 234C to compensate for the Z-direction misalignment and facilitate insertion of electrical contacts 220A, 220C into conductors 150A, 150C. Such rotation of the electrical contacts 220A, 220C may result in at least one of the electrical contacts 220A, 220C being disposed at an angle relative to an X-Y plane (e.g., a horizontal plane). One or more of the electrical contacts 220A, 220B, 220C may, additionally and/or alternatively, be adjusted, moved, slid, etc. along the respective contact rotational axis 228A, 228B, 228C to compensate for any Y-direction misalignment between the electrical contacts 220A, 220B, 220C and the conductors 150A, 150B, 150C.

With embodiments, such as generally illustrated in FIG. 1, a support member 200 may include a first electrical connector 210 and a second electrical connector 210', which may each be rotatable about a respective connector rotational axis 216, 216'. A second electrical connector 210' and components thereof may be configured the same, similar, and/or differently from the first electrical connector 210 and the corresponding components thereof, or vice versa. For example, a second electrical connector 210' may include a first connector section 212', a second connector section 214', an electrical contact 220' rotatable about a contact rotational axis 228', a wire 204', a stabilizer portion 258', a connection portion 264', a mount portion 268', and/or an alignment protrusion 282', some or all of which may be configured in the same or similar manner as corresponding features of an electrical connector 210.

With embodiments, such as generally illustrated in FIGS. 19 and 21-24, an electrical connector 210 may include an adjustment portion 284 configured to facilitate adjustment (e.g., rotation) of the electrical connector 210 to a first position and/or to a second position. An adjustment portion 284 may be connected to and/or integrally formed as part of an electrical connector 210 (e.g., a first connector section 212). An adjustment portion 284 may include a first adjustment section 284A and a second adjustment section 284B, which may project from an adjustment body 284C and/or may be disposed opposite one another. An adjustment body 284C may extend generally in a Y-direction, for example, at least when the electrical connector 210 is in a first position. A first adjustment section 284A and/or a second adjustment section 284B may extend obliquely or perpendicularly relative to an adjustment body 284C and/or a Y-direction, for example, at least when the electrical connector 210 is in a first position.

With embodiments, such as generally illustrated in FIGS. 20A-24, a support member 200 may include a slider 288 configured to facilitate adjustment (e.g., rotation) of an electrical connector 210 to a first position and/or to a second position. A slider 288 may be configured to engage an adjustment portion 284 of an electrical connector 210. A slider 288 may include a slider protrusion 290, which may extend generally in a Y-direction. A slider 288 may include a slider receptacle 292, which may extend and/or protrude into the slider 288, such as generally in a Y-direction. A slider receptacle 292 may be configured to engage and/or receive a portion of an adjustment portion 284 (e.g., a first adjustment section 284A). A slider 288 may include a guide surface 294 configured to engage, contact, and/or abut an adjustment portion 284 (e.g., a first adjustment section 284A and/or a second adjustment section 284B). A slider 288 and/or a guide surface 294 may extend generally in an X-direction. A guide surface 294 may include a first section 294A and/or a second section 294B, which may be at least partially define a slider protrusion 290. A third section 294C may extend from the first section 294A, such as generally in an X-direction. A fourth section 294D may extend from the second section 294B, such as generally in an X-direction, such as in an opposite direction of the third section 294C.

Figure 21A:
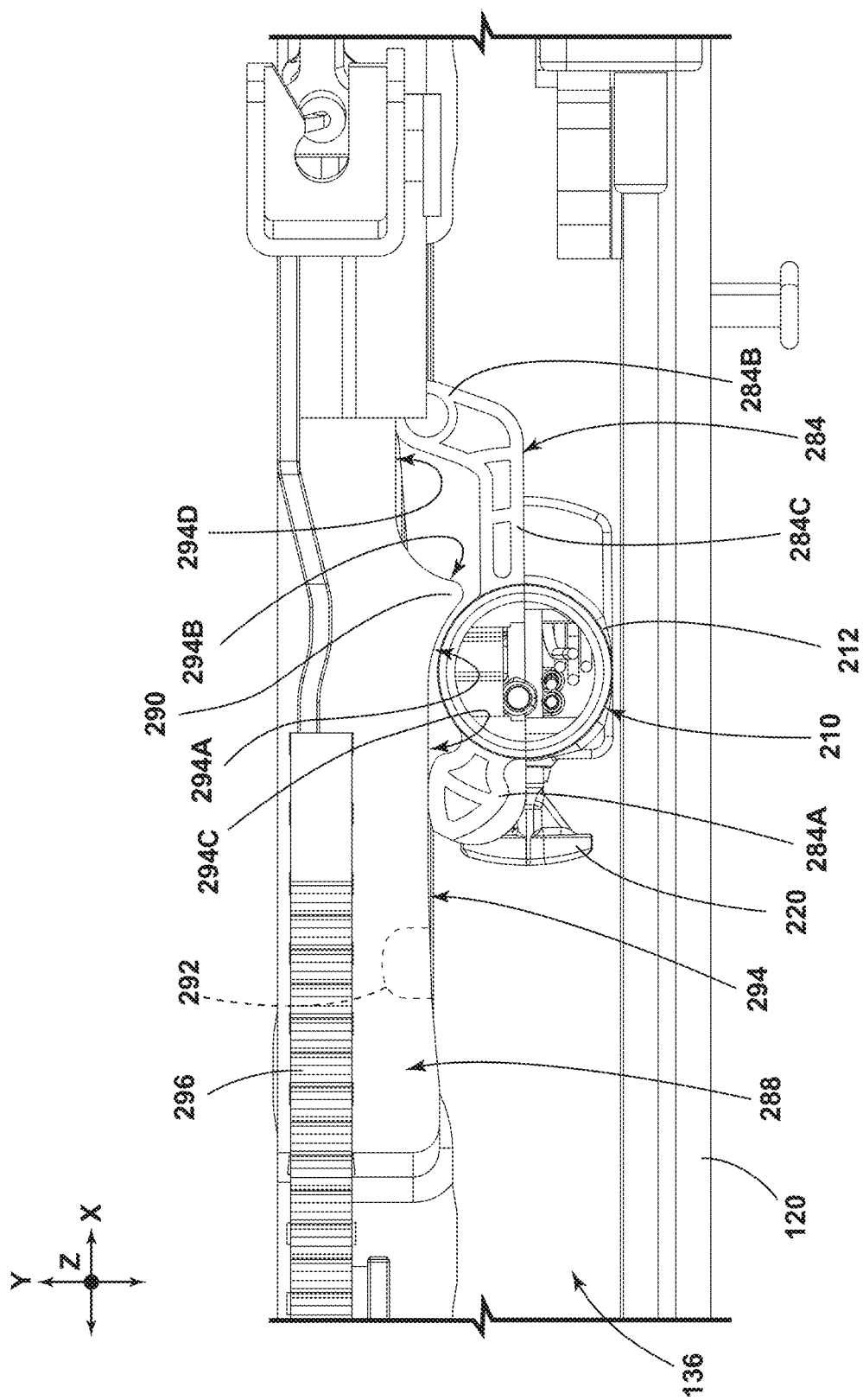
Figure 22:
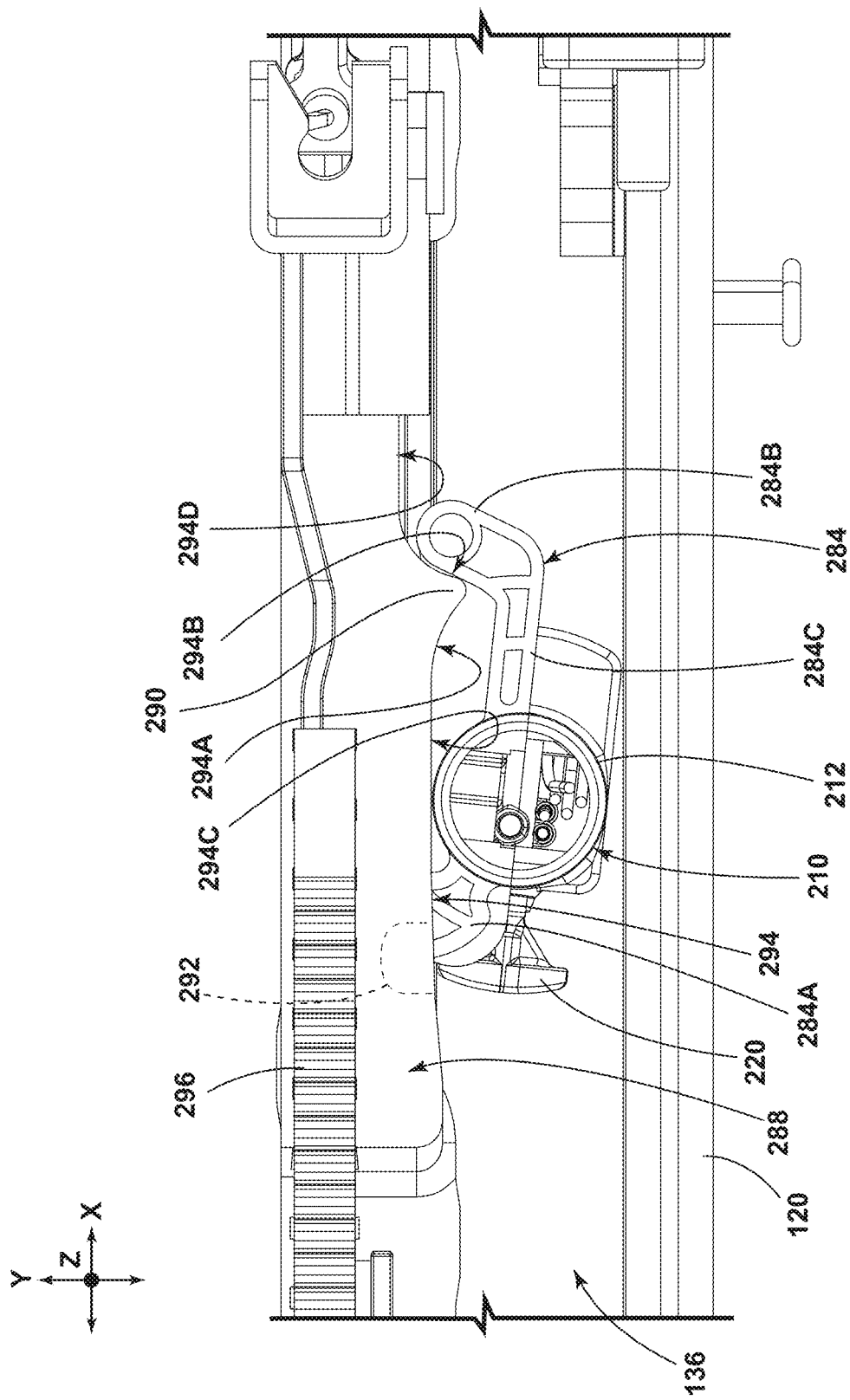
FIGS. 22 and 23 are views generally illustrating an embodiment of an electrical connector including an adjustment portion between a second position and a first position according to teachings of the present disclosure.
Figure 23:
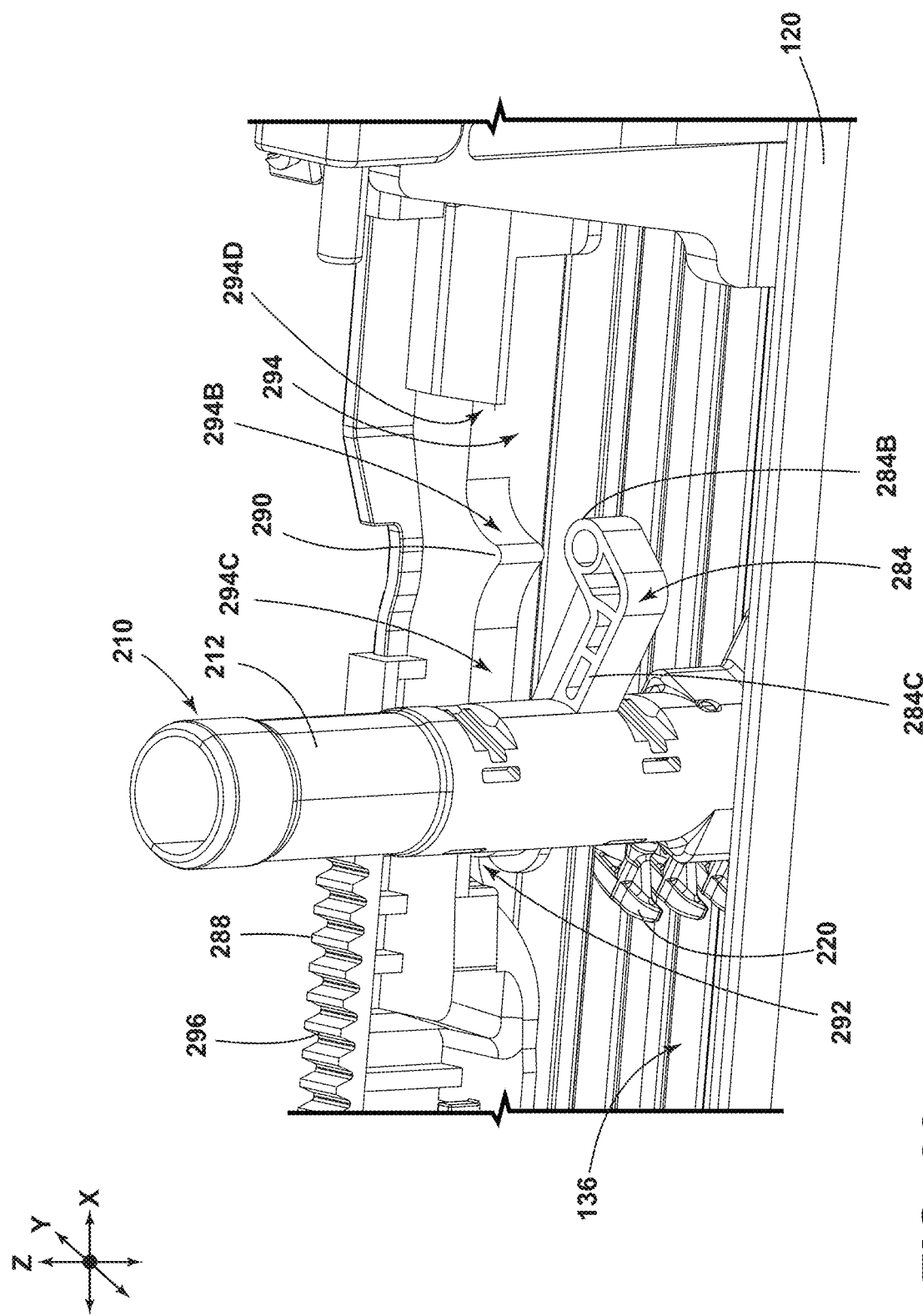
Figure 24:
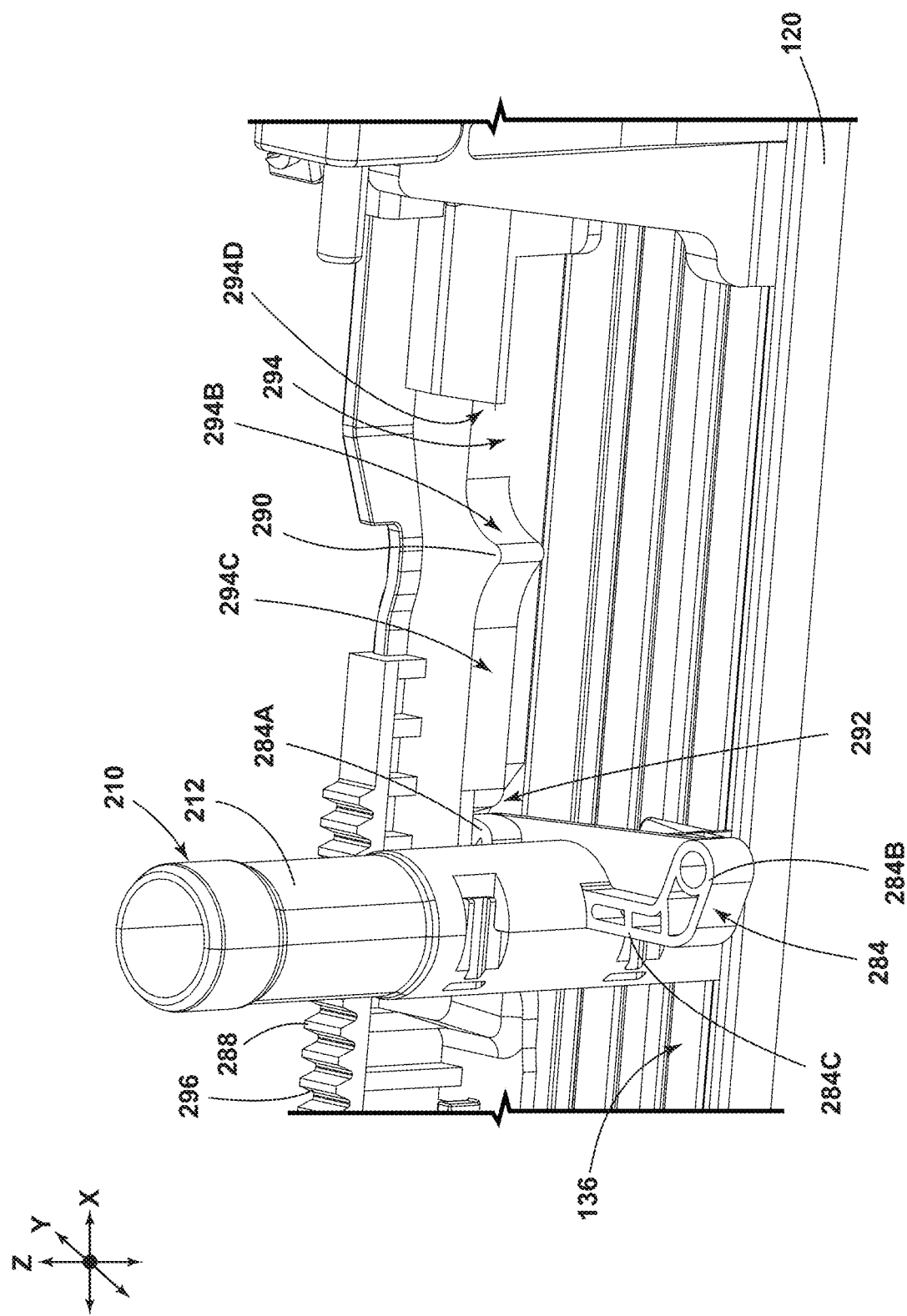
FIG. 24 is a view generally illustrating an embodiment of an electrical connector including an adjustment portion in a first position according to teachings of the present disclosure.

With embodiments, such as generally illustrated in FIGS. 21A, 21B and/or 24, when an electrical connector 210 is in a second position, a first adjustment section 284A may disposed adjacent to and/or in contact with a third section 294C of the guide surface 294, a first connector section 212 may be disposed adjacent to and/or in contact with a first section 294A of the guide surface 294, and/or a second adjustment section 284B may be disposed adjacent to and/or in contact with a fourth section 294D of the guide surface 294 (see, e.g., FIGS. 21A and 21B). When the electrical connector 210 is in a first position (see, e.g., FIG. 24), a first adjustment section 284A may be disposed at least partially in and/or engage a slider receptacle 292 of the slider 288, and/or a second adjustment section 284B may be disposed spaced apart from a guide surface 294 such that, for example, the adjustment portion 284 extends at least partially across a track opening 136 of the track 120.

With embodiments, such as generally illustrated in FIGS. 21A-24, a slider 288 and/or an electrical connector 210 may be adjusted, moved, slid, etc. (e.g., generally in the X-direction), which may cause the adjustment portion 284 to interact with the guide surface 294, which may cause the electrical connector 210 to adjust (e.g., rotate) toward a first position and/or a second position. When moving the slider 288 and/or the electrical connector 210 to adjust the electrical connector 210 toward a first position, for example from a second position (see, e.g., FIGS. 21A and 21B), a first adjustment section 284A may slide along the third section 294C of the guide surface 294 and into engagement with a slider receptacle 292, and/or the second adjustment section 284B may slide along the fourth section 294D of the guide surface 294 into engagement with the slider protrusion 290 (see, e.g., FIG. 22). Continued adjustment of the slider 288 and/or the electrical connector 210 may cause the second adjustment section 284B to slide along the second section 294B of the guide surface 294 (see, e.g., FIG. 23), which may cause the adjustment portion 284 and/or the electrical connector 210 to rotate (e.g., around a Z-direction axis) toward a first position (see, e.g., FIG. 24), which may facilitate or cause the first adjustment section 284A to engage the slider receptacle 292 such that further movement of the slider 288 causes further rotation of the electrical connector 210 via the first adjustment section 284A. The slider 288 and/or the electrical connector 210 may be adjusted/moved, in an opposite direction for example, to adjust the electrical connector 210 toward a second position, which may involve the above described process being conducted in reverse.

In embodiments, a slider 288 may be actuated/moved in one or more of a variety of ways. For example, a user may move the slider 288 directly and/or via a handle/lever/linkage. Additionally or alternatively, the slider 288 may, for example, be actuated via an actuation shaft 298 and/or a pinion 300 connected thereto that may be engaged with teeth 296 of the slider 288 (e.g., the slider 288 may include a gear rack portion). The actuation shaft 298 may be actuated manually and/or via a powered actuator (e.g., an electric motor), for example.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A support member connectable to a track assembly to be removable and adjustable, the support member comprising:
    an electrical connector adjustable to a first position and a second position, the electrical connector including:
    a first contact configured to engage a first conductor of said track assembly; and
    a biasing member;
    wherein the first contact is engageable with said first conductor when the electrical connector is in the first position;
    the first contact is disposed at a distance from said first conductor when the electrical connector is in the second position;
    the biasing member is configured to rotationally bias the first contact into engagement with said first conductor when the electrical connector is in the first position; and
    the electrical connector has a connector rotational axis;
    the first contact protrudes from the electrical connector;
    the first contact has a contact rotational axis that is oblique or perpendicular to the connector rotational axis; and
    the first contact is rotatable about the contact rotational axis.

2. The support member of claim 1, wherein:
    the first contact includes a first surface, a second surface, and a third surface; and
    the second surface extends between and connects the first surface and the third surface such that a transition is defined between the first surface and the third surface.

3. The support member of claim 2, wherein:
    the first contact includes a fourth surface, a fifth surface, and a sixth surface;
    the third surface extends between and connects the second surface and the fourth surface;

the fifth surface extends between and connects the fourth surface and the sixth surface such that a second transition is defined between the fourth surface and the sixth surface; and the sixth surface extends between and connects the fifth surface and the first surface.

4. The support member of claim 3, wherein:

the first surface and the fourth surface are substantially flat;

the third surface and the sixth surface are curved;

in a region of the transition, the third surface is disposed radially farther from an axis of the first contact than the first surface; and in a region of the second transition, the sixth surface is disposed radially farther from the axis of the first contact than the fourth surface.

5. The support member of claim 1, wherein:

the electrical connector includes a second contact, a second biasing member, and an alignment protrusion;

the second contact is configured to engage a second conductor of said track assembly when the electrical connector is in the first position;

the alignment protrusion is disposed adjacent to the second contact and is configured to engage said track assembly to facilitate alignment of the second contact with said second conductor;

the electrical connector is rotatable about and adjustable along the connector rotational axis such that, when the electrical connector is rotated from the second position toward the first position, the electrical connector is adjusted along the connector rotational axis via engagement of the alignment protrusion and said track assembly to substantially align the second contact with said second conductor; and the first contact is rotatable about the contact rotational axis to compensate for misalignment of the first contact with said first conductor.

6. The support member of claim 1, wherein the electrical connector is adjustable to the first position and the second position via rotating about the connector rotational axis.

7. A track system, comprising:

the support member of claim 1; and said track assembly;

the track assembly includes a track and an insulator; and the first conductor is connected to the track via the insulator.

8. The track system of claim 7, wherein:

the first contact includes a first flat surface, a first transition surface, a first curved surface, a second flat surface, a second transition surface, and a second curved surface;

the first flat surface extends between and connects the second curved surface and the first transition surface;

the first transition surface extends between and connects the first flat surface and the first curved surface such that a transition is defined between the first flat surface and the first curved surface;

the first curved surface extends between and connects the first transition surface and the second flat surface;

the second flat surface extends between and connects the first curved surface and the second transition surface;

the second transition surface extends between and connects the second flat surface and the second curved surface such that a second transition is defined between the second flat surface and the second curved surface; and the second curved surface extends between and connects the second transition surface and the first flat surface.

9. The track system of claim 8, wherein:

the first conductor has a substantially U-shaped profile; and the first contact has a first contact rotational axis and is rotationally biased about the first contact rotational axis via the biasing member such that, when the electrical connector is in the first position, (i) the first contact is disposed within the first conductor and (ii) the first curved surface and the second curved surface of the first contact are biased into contact with opposing surfaces of the first conductor.

10. The track system of claim 7, wherein:

the track assembly includes a second conductor;

the electrical connector includes a second contact and a second biasing member;

the second contact is configured to engage the second conductor when the electrical connector is in the first position; and the first contact is configured to rotate about a plurality of axes to facilitate engagement between the first contact and the first conductor.

11. The track system of claim 10, wherein:

the electrical connector includes an alignment protrusion;

the alignment protrusion is configured to engage the insulator such that, when the electrical connector is adjusted from the second position toward the first position, the second contact and the second conductor are substantially aligned with one another via engagement of the alignment protrusion and the insulator; and the first contact is connected with the electrical connector via a ball joint connection such that the first contact is (i) rotatable about a first axis of the plurality of axes to contact the first conductor, and (ii) rotatable about a second axis of the plurality of axes to compensate for misalignment of the first contact and the first conductor.

12. A support member connectable to a track assembly to be removable and adjustable, the support member comprising:

an electrical connector adjustable to a first position and a second position, the electrical connector including a first contact configured to engage a first conductor of said track assembly;

wherein the first contact is engageable with said first conductor when the electrical connector is in the first position;

the first contact is disposed at a distance from said first conductor when the electrical connector is in the second position; and the first contact includes a ball joint portion, a first rotational axis, and a second rotational axis.

13. A track system, comprising:

a track assembly;

a support member connectable to the track assembly to be removable and adjustable, the support member comprising:

an electrical connector adjustable to a first position and a second position, the electrical connector including:

a first contact configured to engage a first conductor of the track assembly; and a biasing member; and wherein the first contact is engageable with said first conductor when the electrical connector is in the first position;

the first contact is disposed at a distance from said first conductor when the electrical connector is in the second position;

the biasing member is configured to rotationally bias the first contact into engagement with said first conductor when the electrical connector is in the first position; and when the first contact is engaged with the first conductor, the biasing member biases (i) a first portion of the first contact toward a top inner surface of the first conductor and (ii) a second portion of the first contact toward a lower inner surface of the first conductor.

14. The track system of claim 13, wherein:

the electrical connector has a connector rotational axis;

the first contact protrudes from the electrical connector;

the first contact has a contact rotational axis that is substantially perpendicular to the connector rotational axis; and the first contact is rotatable about the contact rotational axis.

15. The track system of claim 14, wherein, when the electrical connector is in the first position:

the contact rotational axis extends substantially in a transverse direction of the support member; and the biasing member is offset from the contact rotational axis in a longitudinal direction of the support member.

16. The track system of claim 15, wherein the biasing member is configured to apply a force to the first contact in a substantially vertical direction such that the first contact is rotationally biased into engagement with said first conductor when the electrical connector is in the first position.

17. The support member of claim 14, wherein:

the biasing member includes a spring;

the first contact includes a stabilizer portion, a support protrusion connected to the stabilizer portion, and an engagement protrusion extending from the support protrusion; and the engagement protrusion is engaged with the spring to restrict movement of the spring relative to the support protrusion.

18. The track system of claim 13, wherein the track assembly includes a track and an insulator;

the first conductor is connected to the track via the insulator; and the first conductor is received and retained within a recess of the insulator.

19. The track system of claim 18, wherein:

the electrical connector includes an alignment protrusion; and the recess of the insulator includes a tapered opening configured to engage the alignment protrusion such that, when the electrical connector is adjusted from the second position toward the first position, the first contact and the first conductor are substantially aligned with one another via engagement of the tapered opening and the alignment protrusion.

20. The track system of claim 18, wherein:

the first conductor has a U-shaped profile open in a transverse direction and is configured to at least partially receive the first contact; and the insulator extends beyond the first conductor such that the first contact is guidable into the first conductor via a tapered opening of the recess of the insulator when the electrical connector is adjusted toward the first position.

* * * * *